United States Patent
Qiao et al.

(10) Patent No.: US 11,153,813 B2
(45) Date of Patent: Oct. 19, 2021

(54) NETWORK SLICE FOR VISITED NETWORK

(71) Applicant: Comcast Cable Communications, LLC, Philadelphia, PA (US)

(72) Inventors: Weihua Qiao, Fairfax, VA (US); Esmael Hejazi Dinan, Herndon, VA (US); Kyungmin Park, Oakton, VA (US); Peyman Talebi Fard, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/102,336

(22) Filed: Aug. 13, 2018

(65) Prior Publication Data

US 2019/0053147 A1 Feb. 14, 2019

Related U.S. Application Data

(60) Provisional application No. 62/544,529, filed on Aug. 11, 2017.

(51) Int. Cl.
| | |
|---|---|
| *H04W 48/18* | (2009.01) |
| *H04M 15/00* | (2006.01) |
| *H04L 12/14* | (2006.01) |
| *H04W 8/12* | (2009.01) |
| *H04W 28/24* | (2009.01) |
| *H04W 4/24* | (2018.01) |
| *H04W 60/00* | (2009.01) |

(Continued)

(52) U.S. Cl.
CPC ......... *H04W 48/18* (2013.01); *H04L 12/1407* (2013.01); *H04M 15/66* (2013.01); *H04M 15/8038* (2013.01); *H04W 4/24* (2013.01); *H04W 8/12* (2013.01); *H04W 28/24* (2013.01); *H04W 12/06* (2013.01); *H04W 60/00* (2013.01); *H04W 84/042* (2013.01)

(58) Field of Classification Search
CPC ....... H04W 48/18; H04W 4/24; H04W 28/24; H04W 12/06; H04W 60/00; H04W 84/042
USPC .......................................... 370/329
See application file for complete search history.

(56) References Cited

U.S. PATENT DOCUMENTS

| | | | |
|---|---|---|---|
| 2011/0202635 A1 | 8/2011 | Yeung et al. | |
| 2014/0086177 A1* | 3/2014 | Adjakple | H04W 12/08 370/329 |

(Continued)

FOREIGN PATENT DOCUMENTS

| | | |
|---|---|---|
| CN | 107846275 A | 3/2018 |
| WO | 2015184708 A1 | 12/2015 |

(Continued)

OTHER PUBLICATIONS

Qian (Clara) Li et al., "An end-to-end network slicing framework for 5G wireless communication systems", Aug. 2016, Intel Corporation, USA.

(Continued)

*Primary Examiner* — Yemane Mesfin
*Assistant Examiner* — Intekhaab A Siddiquee
(74) *Attorney, Agent, or Firm* — Banner & Witcoff, Ltd.

(57) ABSTRACT

Systems, apparatuses, and methods are described for wireless communications. Network slicing may be used to provide services for a wireless device. A network slice may be used for a wireless device based on a network entity located in a home public land mobile network (PLMN) or in a visited PLMN.

21 Claims, 19 Drawing Sheets

(51) Int. Cl.
*H04W 84/04* (2009.01)
*H04W 12/06* (2021.01)

(56) References Cited

U.S. PATENT DOCUMENTS

| | | | |
|---|---|---|---|
| 2016/0352645 A1 | 12/2016 | Senarath et al. | |
| 2016/0353268 A1 | 12/2016 | Senarath et al. | |
| 2016/0353367 A1 | 12/2016 | Vrzic et al. | |
| 2017/0054595 A1 | 2/2017 | Zhang et al. | |
| 2017/0086118 A1 | 3/2017 | Vrzic | |
| 2017/0164349 A1 | 6/2017 | Zhu et al. | |
| 2017/0289270 A1 | 10/2017 | Li et al. | |
| 2017/0311304 A1 | 10/2017 | Lu | |
| 2017/0317894 A1 | 11/2017 | Dao et al. | |
| 2017/0324652 A1 | 11/2017 | Lee et al. | |
| 2017/0332421 A1 | 11/2017 | Sternberg et al. | |
| 2017/0359749 A1 | 12/2017 | Dao | |
| 2018/0006954 A1 | 1/2018 | Arora et al. | |
| 2018/0124661 A1 | 5/2018 | Tsai | |
| 2018/0139107 A1 | 5/2018 | Senarath et al. | |
| 2018/0184415 A1 | 6/2018 | Rong et al. | |
| 2018/0199398 A1 | 7/2018 | Dao et al. | |
| 2018/0227873 A1 | 8/2018 | Vrzic et al. | |
| 2018/0262924 A1 | 9/2018 | Dao et al. | |
| 2018/0270712 A1 | 9/2018 | Faccin et al. | |
| 2018/0270744 A1 | 9/2018 | Griot et al. | |
| 2018/0324646 A1 | 11/2018 | Lee et al. | |
| 2018/0332523 A1 | 11/2018 | Faccin et al. | |
| 2019/0045351 A1* | 2/2019 | Zee | H04W 76/11 |
| 2019/0052580 A1 | 2/2019 | Peng et al. | |
| 2019/0075552 A1 | 3/2019 | Yu et al. | |
| 2019/0158364 A1 | 5/2019 | Zhang et al. | |
| 2019/0159107 A1 | 5/2019 | Kim et al. | |
| 2019/0174561 A1 | 6/2019 | Sivavakeesar | |
| 2019/0191348 A1* | 6/2019 | Futaki | H04W 36/12 |
| 2019/0208573 A1 | 7/2019 | Yang et al. | |
| 2019/0223093 A1* | 7/2019 | Watfa | H04W 36/06 |
| 2019/0238425 A1 | 8/2019 | Mladin et al. | |

FOREIGN PATENT DOCUMENTS

| | | | |
|---|---|---|---|
| WO | 2016201999 A1 | 12/2016 |
| WO | 2017074486 A1 | 5/2017 |
| WO | 2017113109 A1 | 7/2017 |
| WO | 2017171598 A1 | 10/2017 |
| WO | 2017173259 A1 | 10/2017 |
| WO | 2018017132 A1 | 1/2018 |
| WO | 2018058579 A1 | 4/2018 |
| WO | 2018093168 A1 | 5/2018 |
| WO | 2018121880 A1 | 7/2018 |
| WO | 2019011794 A1 | 1/2019 |

OTHER PUBLICATIONS

3GPP TS 23.501 V0.4.0 (Apr. 2017), 3rd Generation Partnership Project; Technical Specification Group Services and System Aspects; System Architecture for the 5G System; Stage 2 (Release 15).
R2-1702529 3GPP TSG-RAN WG2 #97bis, Spokane, USA, Apr. 3-7, 2017, Source: Xiaomi, Title: Visibility of Slicing to UE.
R2-1702539 3GPP TSG-RAN2 #97bis, Spokane, USA, Apr. 3-7, 2017, Source: OPPO, Title: Discussion on Mobility Issues of Network Slicing.
R2-1702551 3GPP TSG-RAN WG2 #97bis, Spokane, USA, Apr. 3-7, 2017, Source: Ericsson, Title: Signalling aspects of network slicing.
R2-1702552 Tdoc 3GPP TSG-RAN WG2 #97bis, Spokane, USA, Apr. 3-7, 2017, Source: Ericsson, Title: Slice availability.
R2-1702553 Tdoc 3GPP TSG-RAN WG2 #97bis, Spokane, USA, Apr. 3-7, 2017, Source: Ericsson, Title: Access Control and Resource Isolation for Slicing.
R2-1702554 Tdoc 3GPP TSG-RAN WG2 #97bis, Spokane, USA, Apr. 3-7, 2017, Source: Ericsson, Title: Is UE AA slice agnostic or not?
R2-1702588 3GPP TSG-RAN WG2 #97bis, Spokane, USA, Apr. 3-7, 2017, Source: Huawei, HiSilicon, Title: UE Awareness of Network Slice.
R2-1702589 3GPP TSG-RAN WG2 #97bis, Spokane, USA, Apr. 3-7, 2017, Source: Huawei, HiSilicon, Title: RRC Support for Network Slicing.
R2-1702590 3GPP TSG-RAN WG2 #97bis, Spokane, USA, Apr. 3-7, 2017, Source: Huawei, HiSilicon, Title: Network Slice Selection Assistance Information over RRC.
R2-1702843 3GPP TSG-RAN WG2 #97bis, Spokane, USA, Apr. 3-7, 2017, Source: ZTE, ZTE Microelectronics, Title: Consideration on the NW slice in RAN.
R2-1702969 3GPP TSG-RAN WG2 #97bis, Spokane, USA, Apr. 3-7, 2017, Source: Coolpad, Title: Discussion on UE RRC modeling to support multiple slices per-UE.
R2-1703101 3GPP TSG-RAN WG2 #97bis, Spokane, USA, Apr. 3-7, 2017, Source: CATT, Title: Slice visibility to UE AS.
R2-1703337 3GPP TSG-RAN WG2 #97bis, Spokane, USA, Apr. 3-7, 2017, Source: Samsung, Title: Review on Network Slicing.
R2-1703343 3GPP TSG-RAN WG2 #97bis, Spokane, USA, Apr. 3-7, 2017, Source: Samsung, Title: Slice Information in RRC.
R2-1703762 3GPP TSG-RAN WG2 #97bis, Spokane, USA, Apr. 3-7, 2017, Source: SA3, Title: Reply LS on privacy of registration and slice selection information (revision of Tdoc S3170902 in Busan, Korea from Mar. 27-31, 2017).
R3-170675 3GPP TSG-RAN WG3 #95, Athens, Greece, Feb. 13-17, 2017, Source: Ericsson, Title: Clarifications on the use of NSSAI in Network Slicing.
R3-170677 3GPP TSG-RAN WG3 #95, Athens, Greece, Feb. 13-17, 2017, Source: Ericsson, Title: Mobility and Mapping of NW Slices.
R3-171012 3GPP TSG-RAN WG3 #95bis, Spokane, USA, Apr. 3-7, 2017, Source: CATT, Title: Discussion on Slice-aware mobility.
R3-171029 3GPP TSG-RAN WG3 #95bis, Spokane, USA, Apr. 3-7, 2017, Source: ZTE, Title: Nw Slice Availability Handling Approaches during Mobility.
R3-171047 3GPP TSG-RAN WG3 #95bis, Spokane, USA, Apr. 3-7, 2017, Source: Samsung, Title: RAN supporting Network Slicing.
R3-171097 3GPP TSG-RAN WG3 #95bis, Spokane, USA, Apr. 3-7, 2017, Source: Qualcomm Incorporated, Title: TP for network slicing description.
R3-171115 3GPP TSG-RAN WG3 #95bis, Spokane, USA, Apr. 3-7, 2017, Source: Nokia, Alcatel-Lucent Shanghai Bell, Title: Use of slice ID and NSSAI.
R3-171116 3GPP TSG-RAN WG3 #95bis, Spokane, USA, Apr. 3-7, 2017, Source: Nokia, Alcatel-Lucent Shanghai Bell, Title: Connected mode mobility with slicing.
R3-171117 3GPP TSG-RAN WG3 #95bis, Spokane, USA, Apr. 3-7, 2017, Source: Nokia, Title: LS on slice re-mapping during connected mode mobility.
R3-171128 3GPP TSG-RAN WG3 #95bis, Spokane, USA, Apr. 3-7, 2017, Source: LG Electronics Inc., Title: Discussion on slice availability during mobility.
R3-171129 3GPP TSG-RAN WG3 #95bis, Spokane, USA, Apr. 3-7, 2017, Source: LG Electronics Inc., Title: Mobility procedure considering network slice.
R3-171139 3GPP TSG-RAN WG3 #95bis, Spokane, USA, Apr. 3-7, 2017, Source: Ericsson, Title: RAN aspects of NW slicing in Stage 2 specifications.
R3-171140 3GPP TSG-RAN WG3 #95bis, Spokane, USA, Apr. 3-7, 2017, Source: Ericsson, Title: Stage 2 aspects of CN Instance selection signalling.
R3-171141 3GPP TSG-RAN WG3 #95bis, Spokane, USA, Apr. 3-7, 2017, Source: Ericsson, Title: Signalling aspects of networking slicing.
R3-171142 3GPP TSG-RAN WG3 #95bis, Spokane, USA, Apr. 3-7, 2017, Source: Ericsson, Title: LS regarding RAN support for NW slicing.
R3-171143 3GPP TSG-RAN WG3 #95bis, Spokane, USA, Apr. 3-7, 2017, Source: Ericsson, Title: Slice re-mapping or removal during mobility.
R3-171144 3GPP TSG-RAN WG3 #95bis, Spokane, USA, Apr. 3-7, 2017, Source: Ericsson, Title: LS to SA2 on slices and mobility.

(56) References Cited

OTHER PUBLICATIONS

R3-171250 3GPP TSG-RAN WG3 #95bis, Spokane, USA, Apr. 3-7, 2017, Source: Huawei, Title: Slice Awareness of Availability during Mobility.
R3-171251 3GPP TSG-RAN WG3 #95bis, Spokane, USA, Apr. 3-7, 2017, Source: Huawi, Title: Further Discussion on Slice Remapping.
R3-171252 3GPP TSG-RAN WG3 #95bis, Spokane, USA, Apr. 3-7, 2017, Source: Huawei, Title: Dual Connectivity for Slicing.
R3-171351 3GPP TSG-RAN WG3 #95bis, Spokane, USA, Apr. 3-7, 2017, Source: LG Electronics Inc., Title: TP for exchange of NSSAI in Xn Setup Procedure.
R3-171353 3GPP TSG-RAN WG3 #95bis, Spokane, USA, Apr. 3-7, 2017, Source: Ericsson, Title: RAN aspects of NW slicing in Stage 2 specifications.
R3-171394 3GPP TSG-RAN WG3 #95bis, Spokane, USA, Apr. 3-7, 2017, Source: RAN3, Title: LS regarding RAN support for NW slicing.
R3-171395 3GPP TSG-RAN WG3 #95bis, Spokane, USA, Apr. 3-7, 2017, Source: Ericsson, Title: Stage 2 aspects of CN Instance selection signalling.
R3-171396 3GPP TSG-RAN WG3 #95bis, Spokane, USA, Apr. 3-7, 2017, Source: RAN WG3, Title: LS on slice re-mapping during connected mode mobility.
3GPP TS 36.423 V14.2.0 (Mar. 2017); 3rd Generation Partnership Project; Technical Specification Group Radio Access Network; Evolved Universal Terrestrial Radio Access Network (E-UTRAN); X2 application protocol (X2AP) (Release 14).
3GPP TS 22.261 V15.1.0 (Jun. 2017); Technical Specification; 3rd Generation Partnership Project; Technical Specification Group Services and System Aspects; Service Requirements for the 5G System; Stage 1 (Release 15).
3GPP TS 23.501 V1.2.0 (Jul. 2017); Technical Specification; 3rd Generation Partnership Project; Technical Specification Group Services and System Aspects; System Architecture for the 5G System; Stage 2 (Release 15).
3GPP TS 23.502 V0.5.0 (Jul. 2017); Technical Specification; 3rd Generation Partnership Project; Technical Specification Group Services and System Aspects; Procedures for the 5G System; Stage 2 (Release 15).
3GPP TR 23.799 V14.0.0 (Dec. 2016); Technical Report; 3rd Generation Partnership Project; Technical Specification Group Services and System Aspects; Study on Architecture for the Next Generation System (Release 14).
R2-11xxxx, 3GPP TSG-RAN WG2 #73, Taipei, Taiwan, Feb. 21-25, 2011, Source: InterDigital Communications, Title: Report of Email discussion #26 on Scell Activation in LTE CA.
5G White Paper by Next Generation Mobile Networks (NGMN) Alliance, Version 1.0, Feb. 17, 2015.
S2-174201, SA WG2 Meeting #122; San Jose, Mexico, Jun. 26-30, 2017; Source: Ericsson; Title: Slice co-existence.
S2-174202, SA WG2 Meeting #122; San Jose, Mexico, Jun. 26-30, 2017; Source: Ericsson; Title: NSSF and Slice selection during the Registration procedures (revision of S2-17xxxx).
S2-174246, SA WG2 Meeting #122; San Jose, Mexico, Jun. 26-30, 2017; Source: ZTE, Telecom Italia, Oracle; Title: 23.501—Clarifications on Allowed NSSAI/S-NSSAI.
S2-174247, SA WG2 Meeting #122; San Jose, Mexico, Jun. 26-30, 2017; Source: ZTE, Oracle, China Telecom; Title: 23.501—NSIs compatibility support via organization of NSSAI.
S2-174253, SA WG2 Meeting #122; San Jose, Mexico, Jun. 26-30, 2017; Source: Telecom Italia, Nokia, Alcatel-Lucent Shanghai Bell, ZTE; Title: Network Slicing Support for Roaming.
S2-174262, SA WG2 Meeting #122; San Jose, Mexico, Jun. 26-30, 2017; Source: Motorola Mobility, Lenovo; Title: Application Function influence on slice selection (revision of S2-17xxxx).
S2-174263, SA WG2 Meeting #122; San Jose, Mexico, Jun. 26-30, 2017; Source: Motorola Mobility, Lenovo; Title: Application Function influence on slice selection (revision of S2-17xxxx).
S2-174339, SA WG2 Meeting #122; San Jose, Mexico, Jun. 26-30, 2017; Source: Huawei, HiSilicon; Title: Allowed NSSAI.
S2-174340, SA WG2 Meeting #122; San Jose, Mexico, Jun. 26-30, 2017; Source: Huawei, HiSilicon; Title: TS 23.501—Routing NSSAI to perform AMF selection by (R)AN (revision of S2-17xxxx).
S2-174433, 3GPP TSG SA WG2 Meeting #122; San Jose, Mexico, Jun. 26-30, 2017; Source: Huawei, HiSilicon; Title: TS 23.501—Use Application Data Repository for AF to provide policy requirements that apply to future PDU sessions.
S2-174481, SA WG2 Meeting #122; San Jose, Mexico, Jun. 26-30, 2017; Source: Huawei, HiSilicon; Title: PCF Discovery and Selection.
S2-174485, SA WG2 Meeting #122; San Jose, Mexico, Jun. 26-30, 2017; Source: Qualcomm Incorporated; Title: TS 23.501—Network Triggered change of slices for UE.
S2-174486, SA WG2 Meeting #122; San Jose, Mexico, Jun. 26-30, 2017; Source: Qualcomm Incorporated; Title: TS 23.502—Network Triggered change of slices for UE.
S2-174538; San Jose, Mexico, Jun. 26-30, 2017; Source: Nokia, Alcatel-Lucent Shanghai Bell, Sprint, T-Mobile USA, NEC; Title: Network Slice Instance selection.
S2-174653, SA WG2 Meeting #122; San Jose, Mexico, Jun. 26-30, 2017; Source: NTT DOCOMO; Title: TS 23.502—Clarification of NSSAI stored in the UE's subscription data.
S2-174709, SA WG2 Meeting #122; San Jose, Mexico, Jun. 26-30, 2017; Source: ITRI; Title: Removal of FFS in Section 5.15.1 of TS 23.501 (revision of S2-17xxxx).
S2-174842, 3GPP TSG SA WG2 Meeting #122; San Jose, Mexico, Jun. 26-30, 2017; Source: Huawei, HiSilicon; Title: TS 23.501—Use Application Data Repository for AF to provide policy requirements that apply to future PDU sessions.
S2-174902, 3GPP TSG SA Wg2 Meeting #122; San Jose, Mexico, Jun. 26-30, 2017; Source: Huawei, HiSilicon; Title: TS 23.501—Use Application Data Repository for AF to provide policy requirements that apply to future PDU sessions.
S2-175051, SA WG2 Meeting #122; San Jose, Mexico, Jun. 26-30, 2017; Source: Motorola Mobility, Lenovo, Samsung, SK Telecom; Title: Allowed NSSAI mapping information.
S2-175216, SA WG2 Meeting #122; San Jose, Mexico, Jun. 26-30, 2017; Source: Ericsson; Title: NSSF and Slice selection during the Registration procedures (revision of S2-174992).
S2-175217, SA WG2 Meeting #122; San Jose, Mexico, Jun. 26-30, 2017; Source: Huawei, HiSilicon; Title: On Multiple Network Slice instances.
S2-175218, SA WG2 Meeting #122; San Jose, Mexico, Jun. 26-30, 2017; Source: Motorola Mobility, Lenovo; Title: PDU Session maintenance during change of the set of Network Slice(s) (revision of S2-174996, S2-174713).
S2-175219, SA WG2 Meeting #122; San Jose, Mexico, Jun. 26-30, 2017; Source: Motorola Mobility, Lenovo, Samsung, SK Telecom, Telecom Italia; Title: Allowed NSSAI mapping information (revision of S2-175051, S2-174579).
S2-175271, SA WG2 Meeting #122; San Jose, Mexico, Jun. 26-30, 2017; Source: Ericsson; Title: Slice co-existence (merge of S2-174201+4535+4649+4442).
S2-175296, SA WG2 Meeting #122; San Jose, Mexico, Jun. 26-30, 2017; Source: Huawei, HiSilicon, ZTE, China Mobile, Telecom Italia, Oracle, Ericsson, ITRI, China Telecom, InterDigital, KDDI, ETRI, CATT, China Unicorn, Deutsche Telekom, Verizon, Broadcom, Motorola, Lenovo, Orange, Samsung, AT&T; Title: Network Slice instance selection (revision of S2-175277, 5224, 5045, 4991.
S2-175336, SA WG2 Meeting #122bis; Sophia Antipolis, France, Aug. 21-25, 2017; Packet #92 Doc 109; LS reply to SA2 on Next Generation Roaming (revision of S2-174728).
Apr. 2, 2019—Extended European Search Report—EP 18211009.8.
Huawei et al.—Oct. 17, 2017—"TS 23.501: Support of isolated slice usage in the UE".
Huawei et al.—Nov. 21, 2017—"OI#4f: Support of isolated slice usage in the UE".
Nov. 13, 2017—3rd Generation Partnership Project; Technical Specification Group Services and System Aspects; System Architecture for the 5G Systeml Stage 2 (Release 15).

(56) References Cited

OTHER PUBLICATIONS

S2-175766, SA WG2 Meeting #122bis; Sophia Antipolis, France, Aug. 21-25, 2017; Source: Qualcomm Incorporated; Title: TS 23.501: Network Triggered change of slices for UE.
3GPP TS 23.501 V1.5.0 (Nov. 2017), 3rd Generation Partnership Project; Technical Specification Group Services and System Aspects; System Architecture for the 5G System; Stage 2 (Release 15).
3GPP TS 23.502 V1.3.0 (Nov. 2017); Technical Specification; 3rd Generation Partnership Project; Technical Specification Group Services and System Aspects; Procedures for the 5G System; Stage 2 (Release 15).
S2-175581, SA WG2 Meeting #122bis; Sophia Antipolis, France, Aug. 21-25, 2017; Source: Samsung; Title: Pushing Slice Coexistence Information to the UE.
S2-175601, SA WG2 Meeting #122bis; Sophia Antipolis, France, Aug. 21-25, 2017; Source: Telecom Italia, KDDI, ZTE; Title: 23.501: Network Slice Isolation.
S2-175630, SA WG2 Meeting #122bis; Sophia Antipolis, France, Aug. 21-25, 2017; Source: Telecom Italia, ZTE; Title: Network Slice Coexistence.
S2-175675, SA WG2 Meeting #122bis; Sophia Antipolis, France, Aug. 21-25, 2017; Source: Ericsson; Title: Network Slice Co-Existence Considerations.
S2-175678, SA WG2 Meeting #122bis; Sophia Antipolis, France, Aug. 21-25, 2017; Source: Nokia, Alcatel-Lucent Shanghai Bell; Title: On Coexistence Rules.
S2-175757, SA WG2 Meeting #122bis; Sophia Antipolis, France, Aug. 21-25, 2017; Source: Qualcomm Incorporated; Title: TS 23.501: Support for Slice Co-Existence.
S2-175911, SA WG2 Meeting #122bis; Sophia Antipolis, France, Aug. 21-25, 2017; Source: Huawei, HiSilicon; Title: Simple Slice Coexistence.
S2-175915, SA WG2 Meeting #122bis; Sophia Antipolis, France, Aug. 21-25, 2017; Source: ZTE, Oracle; Title: 23.501: Network Slicing Clause 5.15.5—Early vs. Late Binding of UE with the Associated NSI Corresponding to Allowed S-NSSAI.
S2-177081, SA WG2 Meeting #123; Ljubljana, Slovenia, Oct. 23-27, 2017; Source: Telecom Italia; Title: OI#4a: Network Slice Isolation (23.501).
S2-177297, SA WG2 Meeting #123; Ljubljana, Slovenia, Oct. 23-27, 2017; Source: Huawei, HiSilicon; Title: TS 23.501: Support of Isolated Slice Usage in the UE.
S2-177414, SA WG2 Meeting #123; Ljubljana, Slovenia, Oct. 23-27, 2017; Source: NTT Docomo; Title: TS 23.501: OI#18: Update of SMF and UPF Selection Principle.
S2-177543, SA WG2 Meeting #123; Ljubljana, Slovenia, Oct. 23-27, 2017; Source: Nokia, Nokia Shanghai Bell; Title: 23.501 §6.3.3: NRF for UPF.
S2-177565, SA WG2 Meeting #123; Ljubljana, Slovenia, Oct. 23-27, 2017; Source: Huawei, HiSilicon; Title: OI#18 TS 23.501: Interaction between SMF and UPF on N4 Reference Point.
S2-177566, SA WG2 Meeting #123; Ljubljana, Slovenia, Oct. 23-27, 2017; Source: Huawei, HiSilicon; Title: TS 23.501: UPF Selection based on SMF Local Information.
S2-178097, SA WG2 Meeting #123; Ljubljana, Slovenia, Oct. 23-27, 2017; Source: Huawei, HiSilicon, Samsung, SK Telecom; Title: OI#18 TS 23.501: Interaction between SMF and UPF on N4 Reference Point.
S2-178112, SA WG2 Meeting #123; Ljubljana, Slovenia, Oct. 23-27, 2017; Source: Nokia, Nokia Shanghai Bell, Cisco; Title: 23.501 §6.3.3: NRF for UPF.
S2-178256, SA WG2 Meeting #124; Reno, USA, Nov. 27-Dec. 1, 2017; Source: Nokia, Nokia Shanghai Bell, Verizon, Cisco, Deutsche Telecom; Title: OI#19: 23.501 §6.3.3: NRF for UPF discovery.
S2-178468, SA WG2 Meeting #124; Reno, USA, Nov. 27-Dec. 1, 2017; Source: Huawei, HiSilicon; Title: TS23.502 Clarification on UPF selection in PDU session establishment.
S2-178509, SA WG2 Meeting #124; Reno, USA, Nov. 27-Dec. 1, 2017; Source: Nokia, Nokia Shanghai Bell, Verizon, Cisco, Deutsche Telecom; Title: OI#19: 23.502 §4.17.x: NRF for UPF discovery.
S2-178541, SA WG2 Meeting #124; Reno, USA, Nov. 27-Dec. 1, 2017; Source: Nokia, Nokia Shanghai Bell, Telecom Italia; Title: TS 23.501 OI:4f Coexistence and isolation among network slices.
S2-179779, SA WG2 Meeting #124; Reno, USA, Nov. 27-Dec. 1, 2017; Source: Nokia, Nokia Shanghai Bell; Title: 23.501/§ 6.3.3: location data SMF needs for UPF selection.
S2-178922, SA WG2 Meeting #124; Reno, USA, Nov. 27-Dec. 1, 2017; Source: Huawei, HiSilicon; Title: OI#19 TS 23.501 Proposal on Using UPF Topology for UPF Selection by SMF.
S2-179121 rev1, SA WG2 Meeting #124; Reno, USA, Nov. 27-Dec. 1, 2017; Source: Samsung, Deutsche Telekom; Title: TS 23.502: Clarification on NF Service Discovery.
S2-179325 rev4, SA WG2 Meeting #124; Reno, USA, Nov. 27-Dec. 1, 2017; Source: Nokia, Nokia Shanghai Bell, Verizon, Cisco, Deutsche Telecom; Title: OI#19: 23.502 §4.17.x: NRF for UPF discovery.
S2-179325 rev5, SA WG2 Meeting #124; Reno, USA, Nov. 27-Dec. 1, 2017; Source: Nokia, Nokia Shanghai Bell, Verizon, Cisco, Deutsche Telecom; Title: 01#19: 23.502 §4.17.x: NRF for UPF discovery.
SP-170743, SA WG2 Meeting #1223GPP; Sapporo, Japan, Sep. 13-15, 2017; Source: SA WG2; Title: New SID on Enhancing Topology of SMF and UPF in 5G Networks.

\* cited by examiner

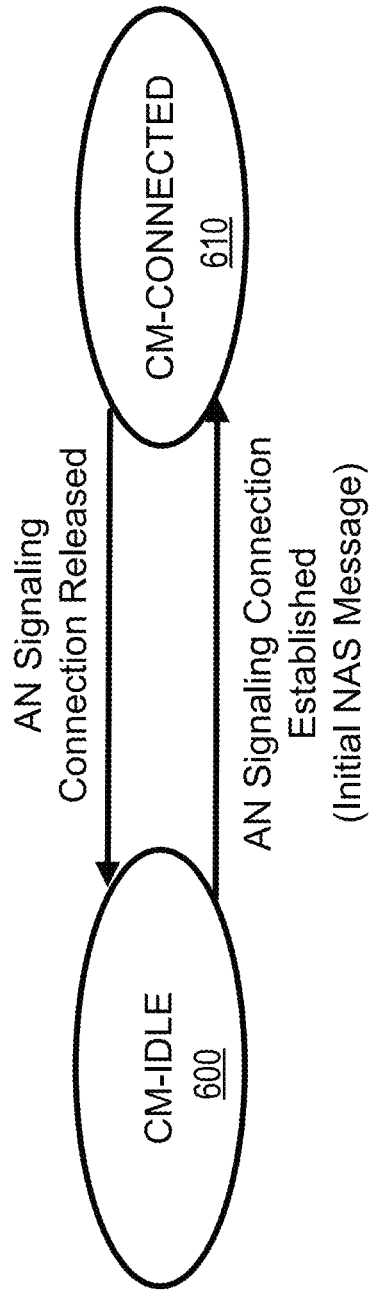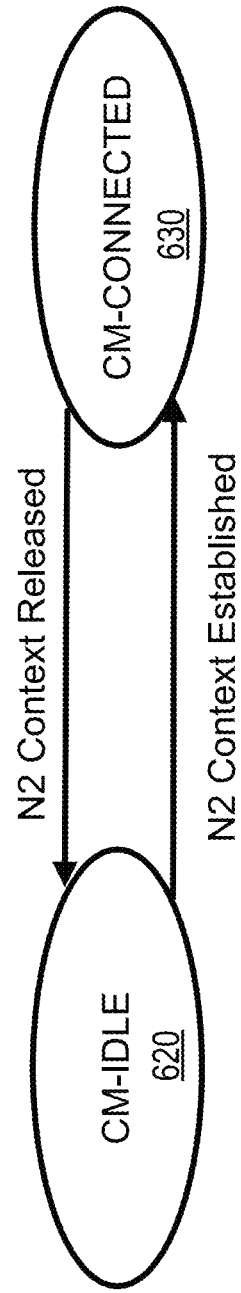

NETWORK SLICE FOR VISITED NETWORK

CROSS-REFERENCE TO RELATED APPLICATIONS

This application claims the benefit of U.S. Provisional Application No. 62/544,529, titled "Application-Initiated Network Slice in Roaming Scenarios" and filed Aug. 11, 2017, the disclosure of which is hereby incorporated by reference in its entirety.

BACKGROUND

A wireless network may provide a variety of mobile devices to communicate using wireless communication channels. Base stations within the network may provide wireless signal coverage for transmission of a variety of data. Network slicing may be used for different device or service types by, for example, creating virtual networks out of physical network resources.

SUMMARY

The following summary presents a simplified summary of certain features. The summary may be not an extensive overview and may be not intended to identify key or critical elements.

Systems, apparatuses, and methods are described for the establishment of dedicated network slices. A network may provide an operator an interface to configure the associations of services to network slices. An interface for the end-to-end management and orchestration entity may provide, for example, dedicated network slices for an application or the ability to map an application to existing network slices. Application initiated network slicing in roaming scenarios may allow for interworking between a visited network and a home network, including interworking between wireless devices and application servers that may have different implementations for a network slicing initiation. Additionally, network slicing may be implemented if the application function may be located in a home PLMN or in the visited PLMN.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIGS. 6A-B shows examples of connection management state models for wireless device and AMF.

DETAILED DESCRIPTION

Figure 1:
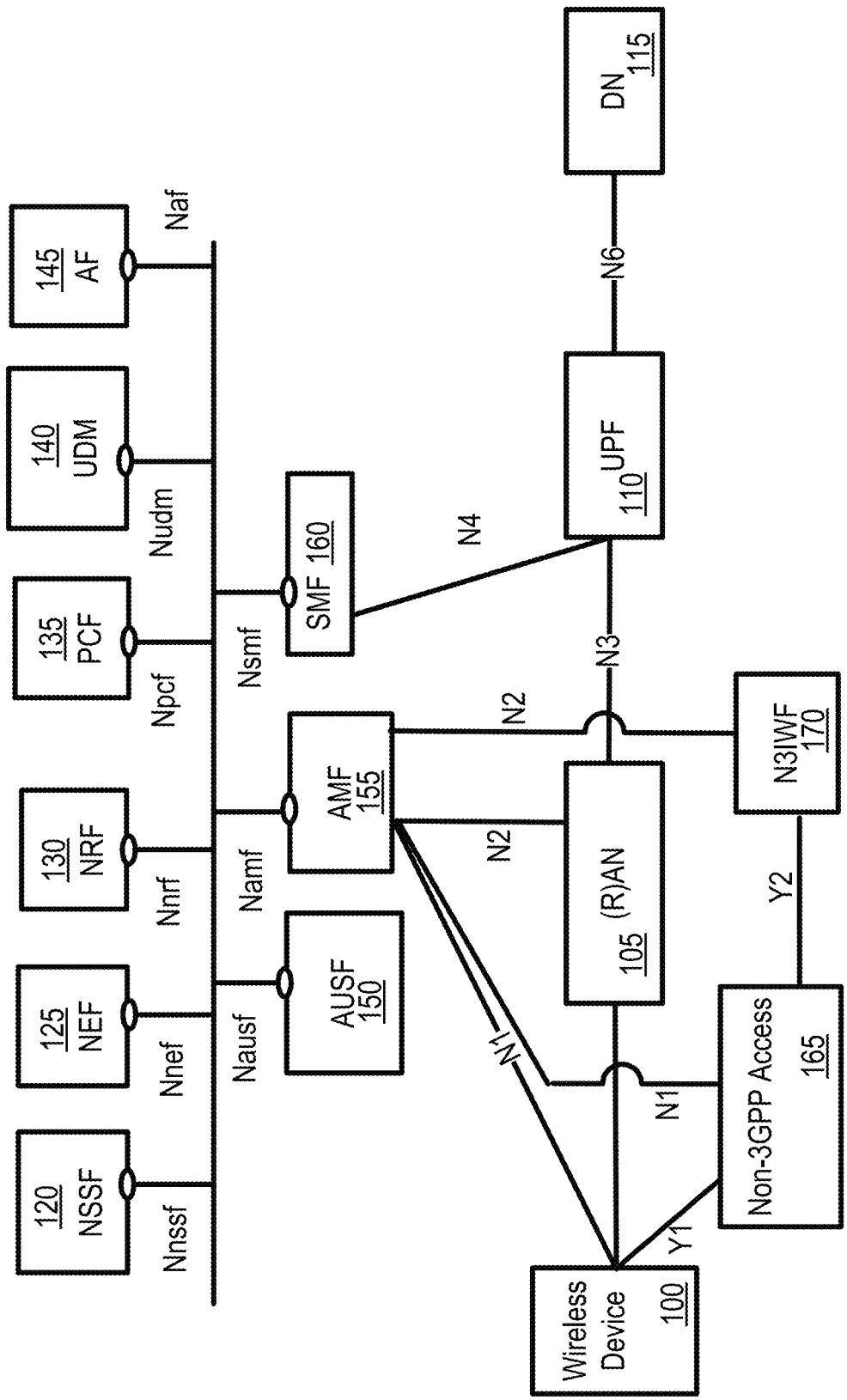
FIG. 1 shows an example 5G system architecture.

The accompanying drawings, which form a part hereof, show examples of the disclosure. It is to be understood that the examples shown in the drawings and/or discussed herein are non-exclusive and that there are other examples of how the disclosure may be practiced. Examples may provide implementation of enhanced features and functionalities networks, including wireless networks such as 5G and other systems. The technology disclosed herein may be employed in the technical field of networks, such as 5G systems, and network slicing for communication systems. More particularly, the technology disclosed herein may relate to for network slicing in communication systems such as 5GC, 5G, or other systems. The communication systems may include any number and/or type of devices, such as, for example, computing devices, wireless devices, mobile devices, handsets, tablets, laptops, internet of things (Iota) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may include any one or more of the above types of devices or similar devices.

The following acronyms are used throughout the present disclosure, provided below for convenience although other acronyms may be introduced in the detailed description.

5G 5th generation mobile networks
5GC 5G Core Network
5GS 5G System
5G-AN 5G Access Network
5QI 5G QoS Indicator
AF Application Function
AMF Access and Mobility Management Function
AN Access Network
AUSF Authentication Server Function
CDR Charging Data Record
CCNF Common Control Network Functions
CP Control Plane
DL Downlink
DN Data Network
DNN Data Network Name
eNB Evolved Node B
gNB Next Generation Node B
HPLMN Home Public Land Mobile Network
LADN Local Area Data Network LI Lawful Intercept
MICO Mobile Initiated Connection Only
N3IWF Non-3GPP InterWorking Function
NAI Network Access Identifier
NAS Non Access Stratum
NEF Network Exposure Function
NF Network Function
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet Data Unit
PLMN Public Land Mobile Network
(R)AN (Radio) Access Network
RAT Radio Access Technology
RRC Radio Resource Control
QFI QoS Flow Identity
RM Registration Management
SBA Service Based Architecture
SEA Security Anchor Function
SCM Security Context Management
SMF Session Management Function
SMSF SMS Function
S-NSSAI Single Network Slice Selection Assistance information
UDM Unified Data Management
UE User Equipment
UL Uplink
UL CL Uplink Classifier
UPF User Plane Function
VPLMN Visited Public Land Mobile Network A 5G access network may include an access network connecting to a 5GC. An access network may include a NG-RAN 105 and/or non-3GPP AN 165. An example 5GC may connect to one or more 5G access networks 5G-AN and/or NG-RANs. The 5GC may include functional elements or network functions as in example FIG. 1 and example FIG. 2 where interfaces are employed for communication among the functional elements and/or network elements. A network function may be a processing function in a network that has a functional behavior and interfaces. A network function may be implemented as a network element on a dedicated hardware, a base station, and/or as a software instance running on a dedicated hardware, shared hardware, and/or as a virtualized function instantiated on an appropriate platform.

The access and mobility management function AMF 155 may include the following functionalities: termination of (R)AN CP interface (N2), termination of NAS (N1), NAS ciphering and integrity protection, registration management, connection management, reachability management, mobility management, lawful intercept (for AMF events and interface to LI system), provide transport for session management, SM messages between wireless device 100 and SMF 160, transparent proxy for routing SM messages, access authentication, access authorization, provide transport for SMS messages between wireless device 100 and SMSF, security anchor function, SEA, interaction with the AUSF 150 and the wireless device 100, receiving the intermediate key established as a result of the wireless device 100 authentication process, security context management, SCM, and/or receiving a key from the SEA that it uses to derive access network specific keys. A variety of these functionalities may be supported in a single instance of an AMF 155 and/or in multiple instances of AMF 155 as appropriate.

The AMF 155 may support non-3GPP access networks through N2 interface with N3IWF 170, NAS signaling with a wireless device 100 over N3IWF 170, authentication of wireless devices connected over N3IWF 170, management of mobility, authentication, and separate security context state(s) of a wireless device 100 connected via non-3GPP access 165 or connected via 3GPP and non-3GPP accesses 105, 165 simultaneously, support of a coordinated RM context valid over 3GPP access 105 and non-3GPP access 165, and/or support of context management (CM) management contexts for the wireless device 100 for connectivity over non-3GPP access. Some functionalities described above may be supported in an instance of a network slice. An AMF 155 region may include of one or multiple AMF 155 sets. AMF 155 set may include of some AMFs 155 that serve a given area and/or network slice(s). Multiple AMF 155 sets may be per AMF 155 region and/or network slice(s). Application identifiers may be mapped to one or more specific application traffic detection rules. A configured NSSAI may be a NSSAI that has been provisioned in a wireless device 100. DN 115 access identifier (DNAI), for a DNN, may be an identifier of a user plane access to a DN 115. Initial registration may be related to a wireless device 100 registration in a RM-DEREGISTERED state. N2AP wireless device 100 association may be a logical per wireless device 100 association between a 5G AN node and an AMF 155. Wireless device 100 may include a N2AP wireless device-TNLA-binding, which may be a binding between a N2AP wireless device 100 association and a specific transport network layer (TNL) association for a given wireless device 100.

The session management function (SMF) 160 may include one or more of the following functionalities: session management (e.g. session establishment, modify and release, including tunnel maintain between UPF 110 and AN 105 node), wireless device IP address allocation & management (including optional authorization), selection and control of UP function(s), configuration of traffic steering at UPF 110 to route traffic to its proper destination, termination of interfaces towards policy control functions, control part of policy enforcement and QoS, lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAB (VPLMN), charging data collection and charging interface (VPLMN), lawful intercept (in VPLMN for SM events and interface to LI System), and/or support for interaction with external DN 115 for transport of signaling for PDU session authorization/authentication by external DN 115. One or more of these functionalities may be supported in a single instance of a SMF 160. One or more of the functionalities described above may be supported in an instance of a network slice.

The user plane function (UPF) 110 may include one or more of the following functionalities: anchor point for Intra-/Inter-RAT mobility (if applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, and/or downlink data notification triggering. One or more of these functionalities may be supported in a single instance of a UPF 110. One or more of functionalities described above may be supported in an instance of a network slice. User plane function(s) (UPF(s)) 110 may handle the user plane path of PDU sessions. A UPF 110 that provides the interface to a data network supports the functionality of a PDU session anchor.

IP address management may include allocation and release of the wireless device IP address as well as renewal of the allocated IP address. The wireless device 100 sets the requested PDU type during the PDU session establishment procedure based on its IP stack capabilities and configuration. The SMF 160 may select PDU type of a PDU session as follows: if the SMF 160 receives a request with PDU type set to IP, the SMF 160 may select either PDU type IPv4 or IPv6 based on DNN configuration and/or operator policies. The SMF 160 may also provide a cause value to the wireless device 100 to indicate whether the other IP version (e.g. IPv6 if IPv4 is selected and vice versa) may be supported on the DNN. If the other IP versions are supported, wireless device 100 may request another PDU session to the same DNN for the other IP version. If the SMF 160 receives a request for PDU type IPv4 or IPv6 and the requested IP version may be supported by the DNN, the SMF 160 selects the requested PDU type. The 5GC elements and wireless device 100 support the following mechanisms: during PDU session establishment procedure, the SMF 160 may send the IP address to the wireless device 100 via SM NAS signaling. The IPv4 address allocation and/or IPv4 parameter configuration via DHCPv4 may also be used if the PDU session may be established. IPv6 prefix allocation may be supported via IPv6 stateless auto configuration, if IPv6 may be supported. IPv6 parameter configuration via stateless DHCPv6 may also be supported. The 5GC may support the allocation of a static IPv4 address and/or a static IPv6 prefix based on subscription information in the UDM 140 or based on the configuration on a per-subscriber, per-DNN basis.

The policy control function PCF 135 may support unified policy framework to govern network behavior, provide policy rules to control plane function(s) to enforce them, and/or implement a front end to access subscription information relevant for policy decisions in a user data repository (UDR). The unified data management UDM 140 may include an application front end (FE) that includes the UDM-FE that may be in charge of processing credentials, location management, and/or subscription management. The PCF 135 may be in charge of policy control and the user data repository (UDR) that stores data required for functionalities provided by UDM-FE, plus policy profiles required by the PCF 135. The data stored in the UDR may include at least user subscription data, including at least subscription identifiers, security credentials, access and mobility related subscription data, session related subscription data, and/or policy data.

The network exposure function NEF 125 may provide a means to securely expose the services and capabilities provided by the 3GPP network functions, translate between information exchanged with the AF 145 and information exchanged with the internal network functions, and/or receive information from other network functions.

The NF repository function NRF 130 may support a service discovery function that receives NF discovery requests from a NF instance, provides the information of the discovered NF instances to the NF instance, and/or maintains the information of available NF instances and their supported services.

The network slice selection function NSSF 120 may support selecting the set of network slice instances serving the wireless device 100, determining the provided NSSAI, determining the AMF 155 set to be employed to serve the wireless device 100, and/or, based on configuration, determining a list of candidate AMF(s) 155, possibly by querying the NRF 130.

The functionality of non-3GPP interworking functionN3IWF for non-3GPP access 165 may include at least one or more of the following: supporting of IPsec tunnel establishment with the wireless device, terminating the IKEv2/IPsec protocols with the wireless device 100 over NWu, relaying over N2 the information needed to authenticate the wireless device 100 and authorize its access to the 5GC, terminating of N2 and N3 interfaces to 5GC for control-plane and user-plane respectively, relaying uplink and downlink control-plane NAS (N1) signaling between the wireless device 100 and AMF 155, handling of N2 signaling from SMF 160 (which may be relayed by AMF 155) related to PDU sessions and QoS, establishing of IPsec security association (IPsec SA) to support PDU session traffic, relaying uplink and downlink user-plane packets between the wireless device 100 and UPF 110, enforcing QoS corresponding to N3 packet marking, considering QoS requirements associated to such marking received over N2, N3 user-plane packet marking in the uplink, local mobility anchor within untrusted non-3GPP access networks 165 using MOBIKE, and/or supporting AMF 155 selection.

The application function AF 145 may interact with the 3GPP core network to provide a variety of services. Based on operator deployment, AF 145 may be trusted by the operator to interact directly with relevant network functions. Application functions not provided by the operator to access directly the network functions may use the external exposure framework (via the NEF 125) to interact with relevant network functions.

The control plane interface between the (R)AN 105 and the 5GC may support connection of multiple different kinds of ANs, such as 3GPP (R)AN 105 and/or N3IWF 170, to the 5GC via a unique control plane protocol. A single N2 AP protocol may be employed for both the 3GPP access 105 and non-3GPP access 165 and/or decoupling between AMF 155 and other functions such as SMF 160 that may need to control the services supported by AN(s) (e.g. control of the UP resources in the AN 105 for a PDU session). The 5GC may be able to provide policy information from the PCF 135 to the wireless device 100. Such policy information may include the following: access network discovery & selection policy, wireless device route selection policy (URSP) that groups to or more of SSC mode selection policy (SSCMSP), network slice selection policy (NSSP), DNN selection policy, and/or non-seamless offload policy. The 5GC may support the connectivity of a wireless device 100 via non-3GPP access networks 165. As shown in example FIG. 5, the registration management, RM may be employed to register or de-register a wireless device 100 with the network, and establish the user context in the network. Connection management may be employed to establish and release the signaling connection between the wireless device 100 and the AMF 155.

Figure 8A:
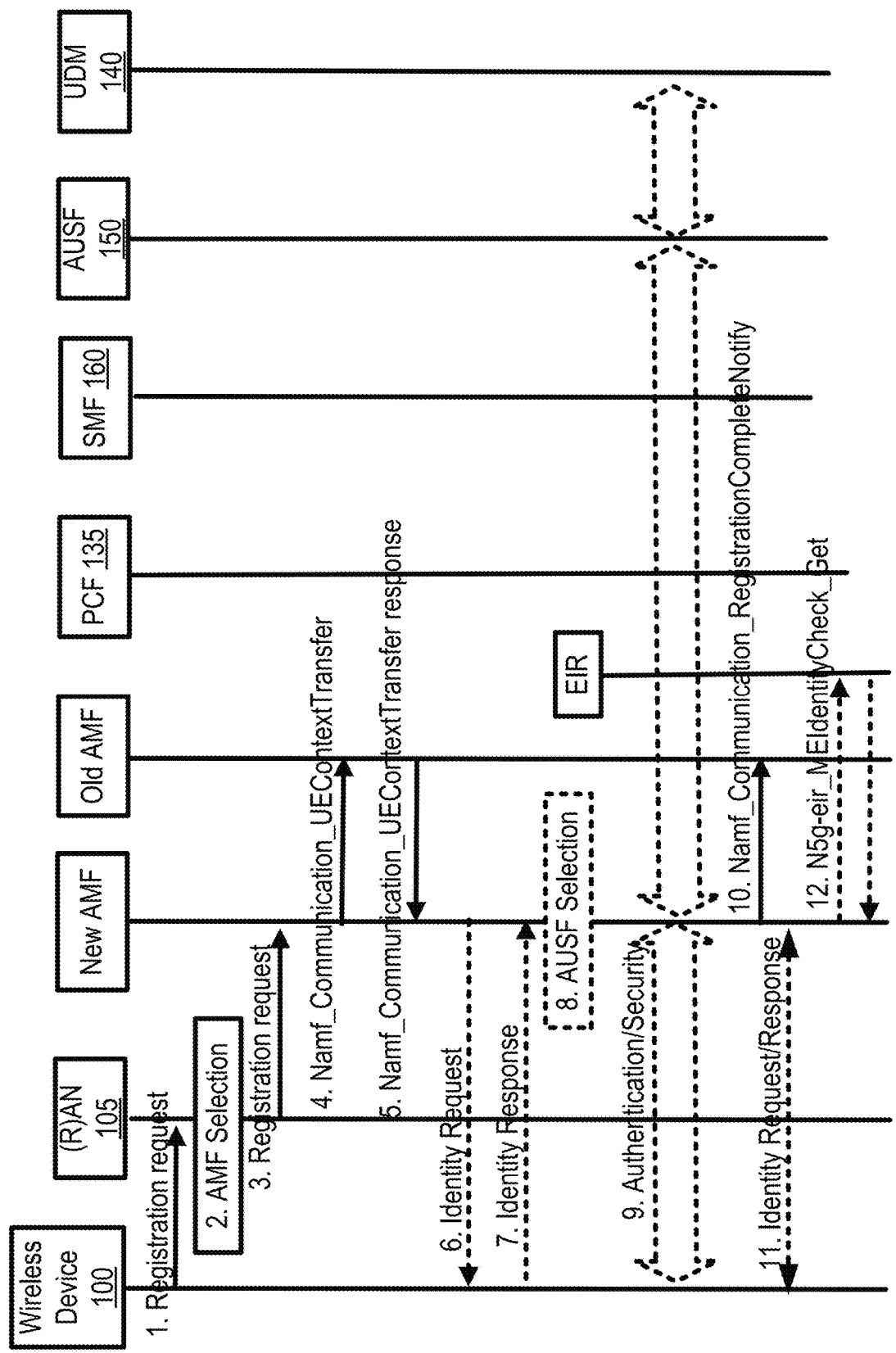
FIGS. 8A-B shows examples of registration procedures.
Figure 8B:
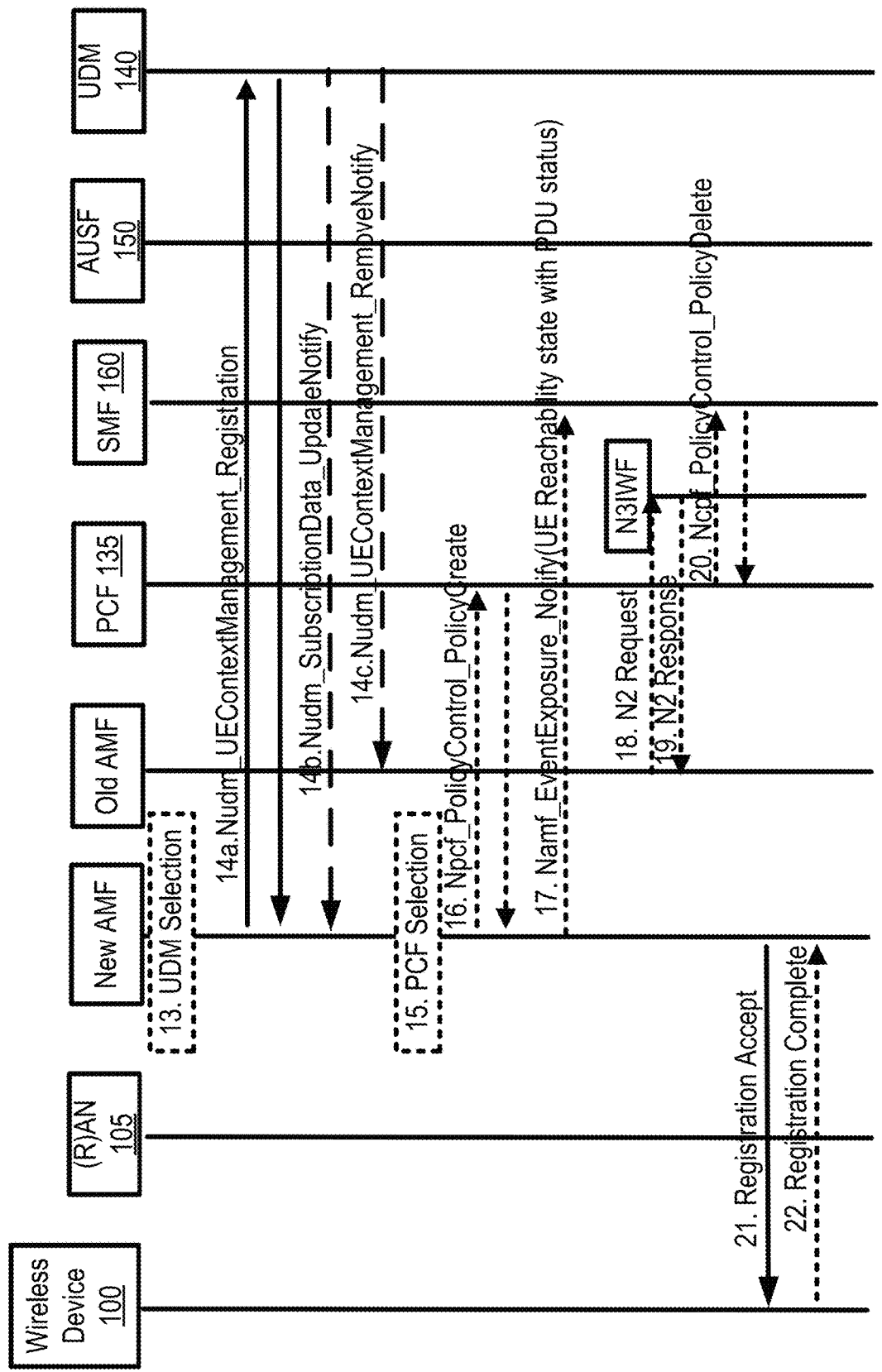

A wireless device 100 may need to register with the network to receive services that require registration. The wireless device 100 may update its registration with the network, e.g., periodically, after the wireless device is registered, to remain reachable (e.g. periodic registration update), on mobility (e.g. mobility registration update), and/or to update its capabilities or re-negotiate protocol parameters. The initial registration procedure, as depicted in example FIG. 8A and FIG. 8B, may involve execution of network access control functions (e.g. user authentication and access authorization based on subscription profiles in UDM 140). As result of the registration procedure, the identity of the serving AMF 155 may be registered in UDM 140. The registration management (RM) procedures may be applicable over both 3GPP access 105 and non-3GPP access 165. Systems and methods for connection, registration, and mobility management procedures that may be utilized as shown in FIGS. 8A-B are described in "5G; Procedures for the 5G System," ETSI TS 123 502 version 15.2.0, also 3GPP TS 23.502 version 15.2.0 Release 15, dated June 2018 and published by the European Telecommunications Standards Institute.

Figure 3:
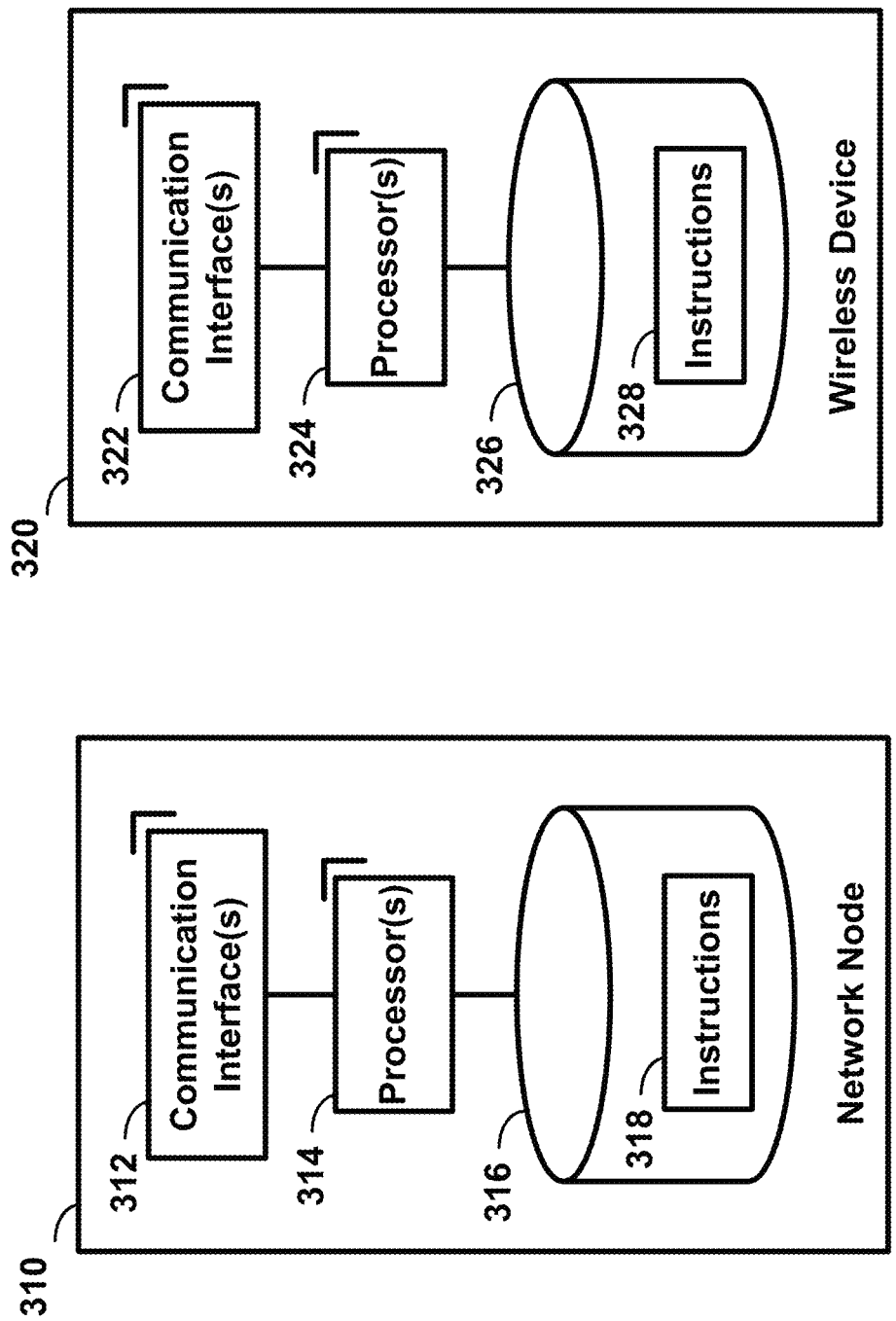
FIG. 3 shows an example of a wireless device and a base station.

FIG. 3 shows an example of hardware elements of a base station 310 and a wireless device 320. A communication network may include at least one base station 310 and at least one wireless device 320. The base station 310 may include at least one communication interface 312, one or more processors 314, and at least one set of program code instructions 318 stored in non-transitory memory 316 and executable by the one or more processors 314. The wireless device 320 may include at least one communication interface 322, one or more processors 324, and at least one set of program code instructions 328 stored in non-transitory memory 326 and executable by the one or more processors 324. A communication interface 312 in the base station 310 may be configured to engage in communication with a communication interface 322 in the wireless device 320, such as via a communication path that includes at least one wireless link. The wireless link may be a bi-directional link. The communication interface 322 in the wireless device 320 may also be configured to engage in communication with the communication interface 312 in the base station 310. The base station 310 and the wireless device 320 may be configured to send and receive data over the wireless link using multiple frequency carriers.

Figure 4:
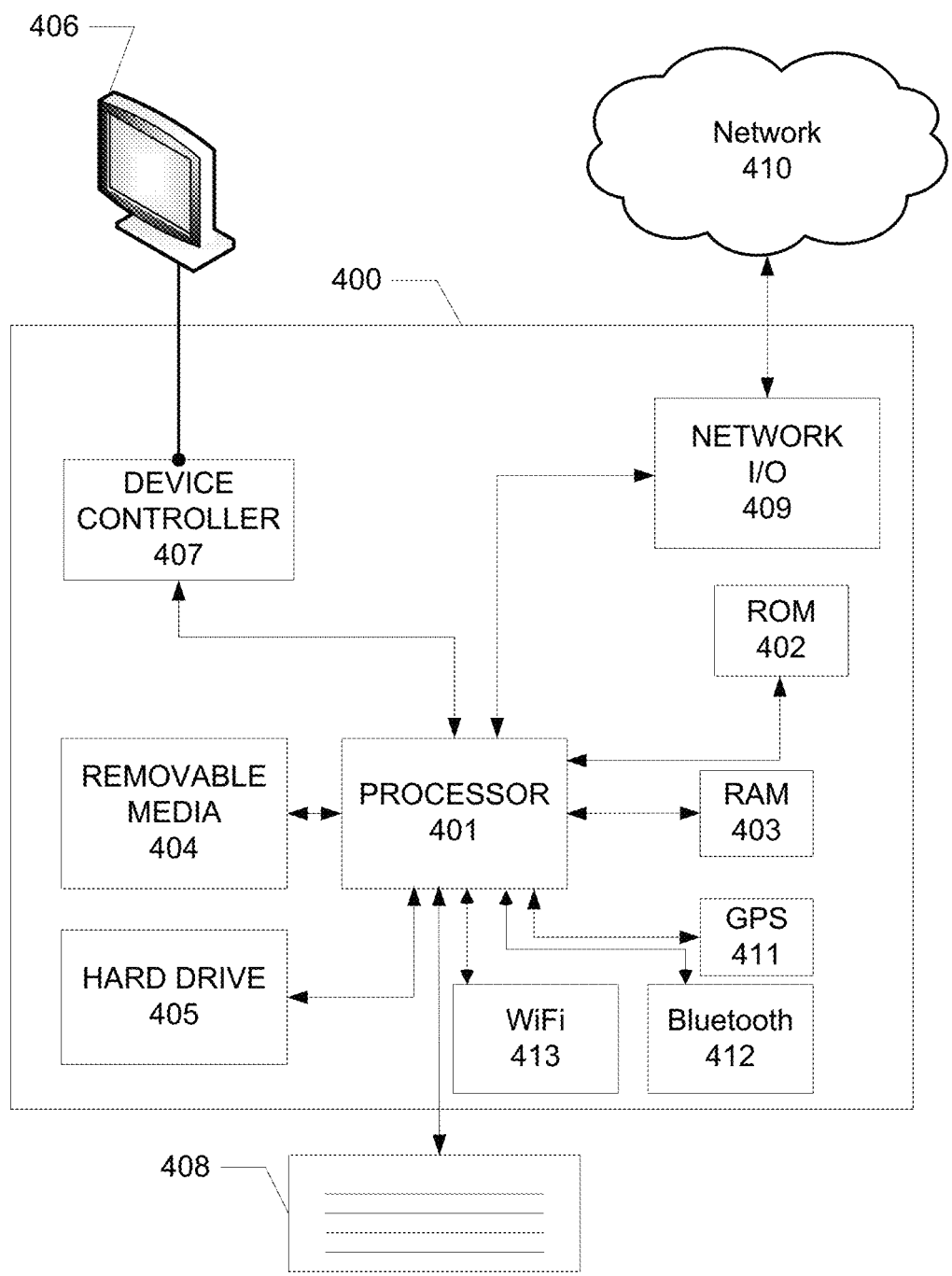
FIG. 4 shows example elements of a computing device that may be used to implement any of the various devices described herein.

FIG. 4 shows general hardware elements that may be used to implement any of the various computing devices discussed herein, including any base station, wireless device, or computing device. The computing device 400 may include one or more processors 401, which may execute instructions stored in the random access memory (RAM) 403, the removable media 404 (such as a Universal Serial Bus (USB) drive, compact disk (CD) or digital versatile disk (DVD), or floppy disk drive), or any other desired storage medium. Instructions may also be stored in an attached (or internal) hard drive 405. The computing device 400 may also include a security processor (not shown), which may execute instructions of a one or more computer programs to monitor the processes executing on the processor 401 and any process that requests access to any hardware and/or software components of the computing device 400 (e.g., ROM 402, RAM 403, the removable media 404, the hard drive 405, the device controller 407, a network interface 409, a GPS 411, a Bluetooth interface 412, a WiFi interface 413, etc.). The computing device 400 may include one or more output devices, such as the display 406 (e.g., a screen, a display device, a monitor, a television, etc.), and may include one or more output device controllers 407, such as a video processor. There may also be one or more user input devices 408, such as a remote control, keyboard, mouse, touch screen, microphone, etc. The computing device 400 may also include one or more network interfaces, such as a network interface 409, the may be a wired interface, a wireless interface, or a combination of the two. The network interface 409 may provide an interface for the computing device 400 to communicate with a network 410 (e.g., a RAN, or any other network). The network interface 409 may include a modem (e.g., a cable modem), and the external network 400 may include communication links, an external network, an in-home network, a provider's wireless, coaxial, fiber, or hybrid fiber/coaxial distribution system (e.g., a DOCSIS network), or any other desired network. Additionally, the computing device 400 may include a location-detecting device, such as a global positioning system (GPS) microprocessor 411, which may be configured to receive and process global positioning signals and determine, with possible assistance from an external server and antenna, a geographic position of the computing device 400.

The example in FIG. 4 is a hardware configuration, although the components shown may be implemented as software as well. Modifications may be made to add, remove, combine, divide, etc. components of the computing device 400 as desired. Additionally, the components may be implemented using basic computing devices and components, and the same components (e.g., processor 401, ROM storage 402, display 406, etc.) may be used to implement any of the other computing devices and components described herein. For example, the various components described herein may be implemented using computing devices having components such as a processor executing computer-executable instructions stored on a computer-readable medium, as shown in FIG. 4. Some or all of the entities described herein may be software based, and may coexist in a common physical platform (e.g., a requesting entity may a separate software process and program from a dependent entity, both of which may be executed as software on a common computing device).

Base stations, wireless devices, relay nodes, and other communication devices may include one or more transceivers. A transceiver may be a device that includes both a transmitter and receiver. The communication network may include any number and/or type of devices, such as, for example, computing devices, wireless devices, mobile devices, handsets, tablets, laptops, internet of things (IoT) devices, hotspots, cellular repeaters, computing devices, and/or, more generally, user equipment. Although one or more of the above types of devices may be referenced herein (e.g., user equipment, wireless device, computing device, etc.), it should be understood that any device herein may include any one or more of the above types of devices or similar devices. The communication network, and any other network referenced herein, may include an LTE network, a 5G network, or any other network for wireless communications. Apparatuses, systems, and/or methods described herein may generally be described as implemented on one or more devices (e.g., a wireless device, base station, eNB, gNB, computing device, etc.), in one or more networks, but it will be understood that one or more features and/or steps may be implemented on any device and/or in any network. As used throughout, the term "base station" may comprise one or more of: a base station, a node, a Node B, a gNB, an eNB, am ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

Figure 5A:
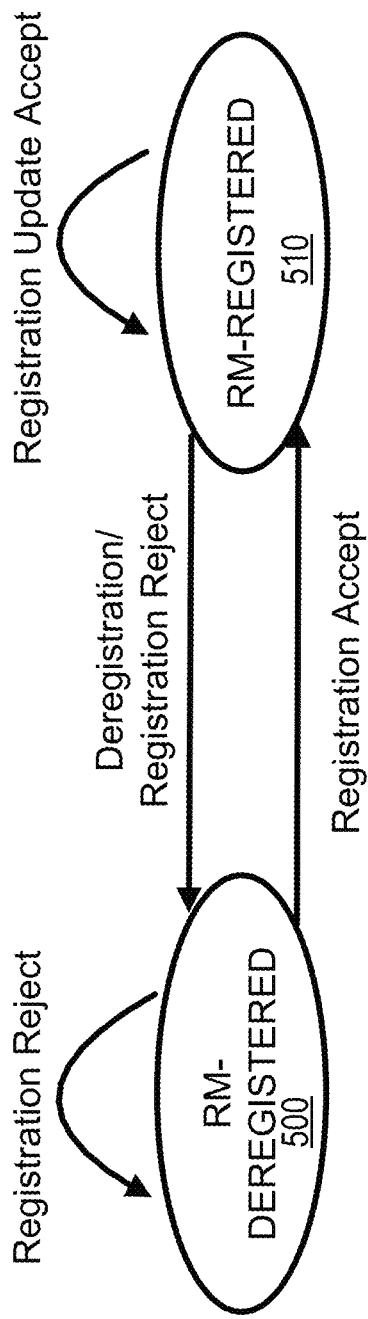
FIGS. 5A-B shows examples of registration management state models for a wireless device and access and mobility management function (AMF).
Figure 5B:
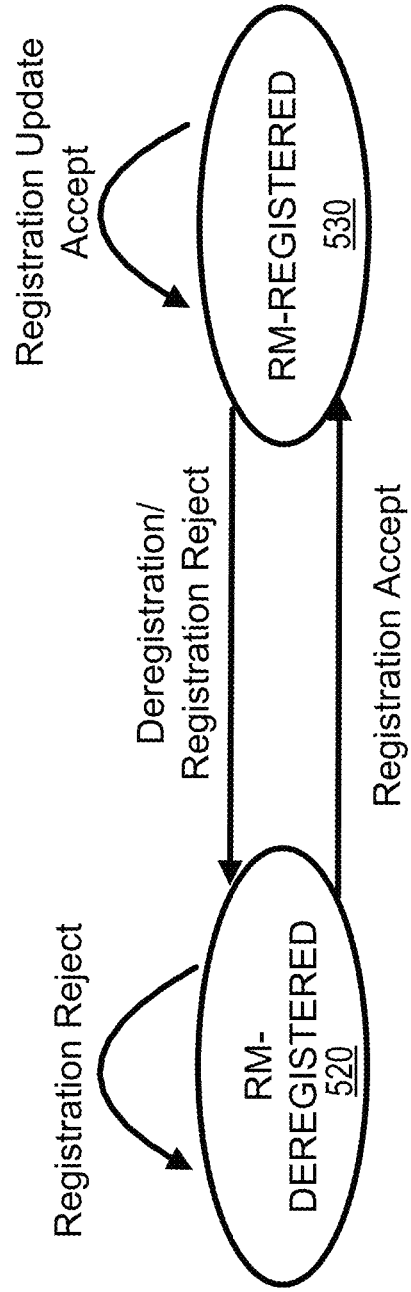

FIGS. 5A-B depict examples of the RM states of a wireless device 100 as observed by the wireless device 100 and AMF 155 respectively. In FIG. 5A, two RM states may be used in a wireless device 100 and the AMF 155 that reflect the registration status of the wireless device 100 in the selected PLMN: RM-DEREGISTERED 500, and RM-REGISTERED 510. In the RM DEREGISTERED state 500, the wireless device 100 may not be registered with the network. The wireless device 100 context in AMF 155 may not hold valid location or routing information for the wireless device 100 so the wireless device 100 may be not reachable by the AMF 155. Some wireless device 100 context may still be stored in the wireless device 100 and the AMF 155. In the RM REGISTERED state 510, the wireless device 100 may be registered with the network. In the RM-REGISTERED 510 state, the wireless device 100 may receive services that require registration with the network. In FIG. 5B, two RM states may be used in AMF 155 for a wireless device 100 that reflect the registration status of the wireless device 100 in the selected PLMN: RM-DEREGISTERED 520 and RM-REGISTERED 530.

FIGS. 6A-B depict examples of CM state transitions as observed by the wireless device 100 and AMF 155 respectively. Connection management CM may include the functions of establishing and releasing a signaling connection between a wireless device 100 and the AMF 155 over N1. This signaling connection may be used to provide NAS signaling exchange between the wireless device 100 and a core network. It may include both the AN signaling connection between the wireless device 100 and/or the (R)AN 105 (e.g. RRC connection over 3GPP access) and the N2 connection for this wireless device 100 between the AN and the AMF 155. As depicted in FIG. 6A, two CM states may be used for the NAS signaling connectivity of the wireless device 100 with the AMF 155, CM-IDLE 600, 620 and CM-CONNECTED 610, 630. A wireless device 100 in CM-IDLE 600 state may be in RM-REGISTERED 510 state and has no NAS signaling connection established with the AMF 155 over N1. The wireless device 100 may perform cell selection, cell reselection and PLMN selection. A wireless device 100 in CM-CONNECTED 610 state has a NAS signaling connection with the AMF 155 over N1. RRC inactive state may apply to NG-RAN (e.g. it applies to NR and E-UTRA connected to 5G CN). The AMF 155, based on network configuration, may provide assistance information to the NG (R)AN 105, to assist the NG (R)AN's 105 decision whether the wireless device 100 may be sent to RRC inactive state. If a wireless device 100 may be CM-CONNECTED 610 with RRC inactive state, the wireless device 100 may resume the RRC connection (e.g. due to uplink data pending), may execute a mobile initiated signaling procedure (e.g. as a response to (R)AN 105 paging), and/or notify the network that it has left the (R)AN 105 notification area. NAS signaling connection management may include the functions of establishing and releasing a NAS signaling connection. NAS signaling connection establishment function may be provided by the wireless device 100 and the AMF 155 to establish a NAS signaling connection for a wireless device 100 in CM-IDLE 600 state. The procedure of releasing a NAS signaling connection may be initiated by the 5G (R)AN 105 node or the AMF 155.

In FIG. 6B, two CM states may be used for a wireless device 100 at the AMF 155, CM-IDLE 620 and CM-CONNECTED 630. Reachability management of the wireless device 100 may detect whether a wireless device 100 may be reachable and/or provide the wireless device location (e.g. the access node in communication with the wireless device) for the network to reach the wireless device 100. This may be done by paging wireless device 100 and wireless device location tracking. The wireless device location tracking may include both wireless device registration area tracking and wireless device reachability tracking. Such functionalities may be either located at 5GC (e.g. for a CM-IDLE 620 state) or NG-RAN 105 (e.g. for a CM-CONNECTED 630 state). The wireless device 100 and the AMF 155 may negotiate wireless device 100 reachability characteristics in CM-IDLE 600, 620 state during registration and registration update procedures. A variety of wireless device reachability categories may be negotiated between a wireless device 100 and an AMF 155 for CM-IDLE 600, 620 state, such as wireless device 100 reachability providing mobile device terminated data. The wireless device 100 may be CM-IDLE 600 mode and mobile initiated connection only (MICO) mode. The 5GC may support a PDU connectivity service that provides exchange of PDUs between a wireless device 100 and a data network identified by a DNN. The PDU connectivity service may be supported via PDU sessions that may be established, e.g. after request from the wireless device 100.

A PDU session may support one or more PDU session types. PDU sessions may be established (e.g. after wireless device 100 request), modified (e.g. after wireless device 100 and 5GC request) and released (e.g. after wireless device 100 and 5GC request) using NAS SM signaling exchanged over N1 between the wireless device 100 and the SMF 160. The 5GC may be able to trigger a specific application in the wireless device 100 (e.g., after a request from an application server). If receiving that trigger message, the wireless device 100 may pass it to the identified application in the wireless device 100. The identified application in the wireless device 100 may establish a PDU session to a specific DNN.

Figure 7:
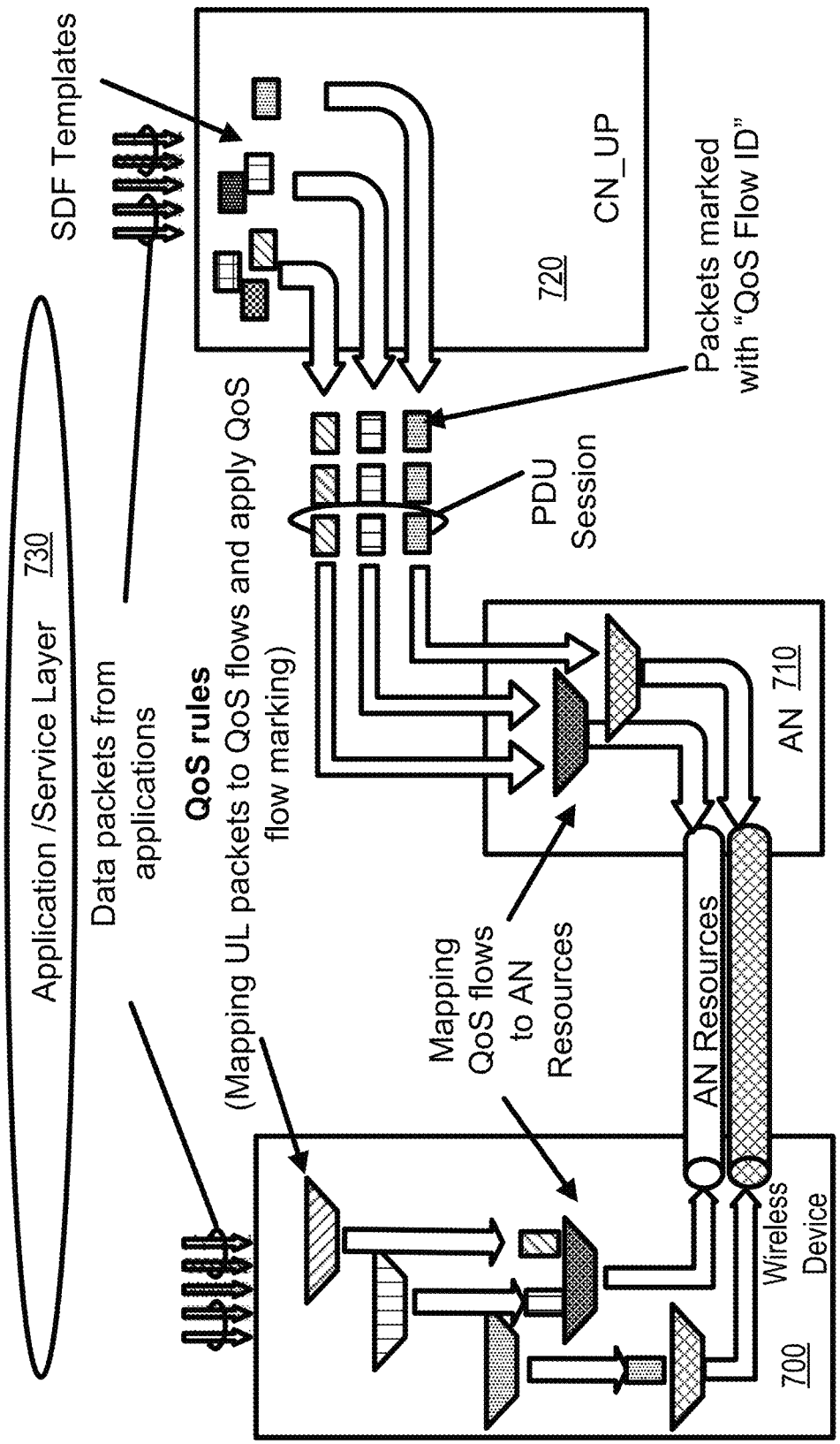
FIG. 7 shows an example for classification and marking traffic.

The 5G QoS model may support a QoS flow based framework, an example of which may be shown in FIG. 7. The 5G QoS model may support both QoS flows that require a guaranteed flow bit rate and QoS flows that may not require a guaranteed flow bit rate. The 5G QoS model may also support reflective QoS. The QoS model may comprise flow mapping or packet marking at the CN_UP 720, AN 710, and/or wireless device 700. Packets may arrive from and/or destined to the application/service layer 730 of wireless device 700, CN_UP 720, and/or the AF 145. QoS flow may be granular of QoS differentiation in a PDU session. A QoS Flow IDQFI may be used to identify a QoS flow in the 5G system. User plane traffic with the same QFI within a PDU session may receive the same traffic forwarding treatment. The QFI may be carried in an encapsulation header on N3 (and N9) e.g. without any changes to the end-to-end packet header. The QFI may be used with PDUs having different types of payload. The QFI may be unique within a PDU session.

The QoS parameters of a QoS flow may be provided to the (R)AN as a QoS profile over N2 at PDU session or at QoS flow establishment, and NG-RAN may be used if the user plane may be activated. A default QoS rule may be utilized for every PDU session. The SMF 160 may allocate the QFI for a QoS flow and may derive its QoS parameters from the information provided by the PCF. The SMF 160 may provide the QFI together with the QoS profile containing the QoS parameters of a QoS flow to the (R)AN 710. 5G QoS flow may be granular for QoS forwarding treatment in a 5G system. Traffic mapped to the same 5G QoS flow may receive the same forwarding treatment (e.g. scheduling policy, queue management policy, rate shaping policy, RLC configuration, and/or the like). Providing different QoS forwarding treatment may require separate 5G QoS flow. A 5G QoS indicator may be used as a reference to a specific QoS forwarding behavior (e.g. packet loss rate, packet delay budget) to be provided to a 5G QoS flow. This may be implemented in the access network by the 5QI referencing node specific parameters that control the QoS forwarding treatment (e.g. scheduling weights, admission thresholds, queue management thresholds, link layer protocol configuration, and/or the like).

5GC may support edge computing and may provide operators and/or third party services to be hosted close to the wireless device access point of attachment. The 5GC may select a UPF 110 close to the wireless device 100 and may execute the traffic steering from the UPF 110 to the LADN via a N6 interface. This may be based on the wireless device subscription data, wireless device location, the information from application function AF 145, policy, and/or other related traffic rules. The 5GC may expose network information and capabilities to an edge computing application function. The functionality support for edge computing may include local routing where the 5GC may select UPF 110 to route the user traffic to the LADN, traffic steering where the 5GC selects the traffic to be routed to the applications in the LADN, session and service continuity to provide wireless device 100 and application mobility, user plane selection and reselection (e.g. based on input from application function), network capability exposure where 5GC and application function may provide information to each other via NEF, QoS and charging where PCF may provide rules for QoS control and charging for the traffic routed to the LADN, and/or support of local area data network where 5GC may provide support to connect to the LADN in a certain area where the applications are deployed.

An example 5G system may be a 3GPP system including of 5G access network 105, 5GC and a wireless device 100, and/or the like. Provided NSSAI may be an NSSAI provided by a serving PLMN during e.g. a registration procedure, indicating the NSSAI provided by the network for the wireless device 100 in the serving PLMN for the current registration area. A periodic registration update may be wireless device 100 re-registration at expiry of a periodic registration timer. A requested NSSAI may be a NSSAI that the wireless device 100 may provide to the network. A service-based interface may represent how a set of services may be provided/exposed by a given NF.

A PDU connectivity service may provide exchange of PDUs between a wireless device 100 and a data network. PDU session may be an association between a wireless device 100 and a data network, DN that provides a PDU connectivity service. The type of association may be IP, Ethernet, or unstructured. Service continuity may comprise an uninterrupted user experience of a service, e.g. if the IP address and/or anchoring point change. Session continuity may comprise the continuity of a PDU session. For PDU session of IP type session continuity may imply that the IP address may be preserved for the lifetime of the PDU session. An uplink classifier may be a UPF functionality that aims at diverting uplink traffic, based on filter rules provided by SMF, towards data network.

The 5G system architecture may support data connectivity and services enabling deployments to use techniques such as, but not limited to, network function virtualization and/or software defined networking. The 5G system architecture may leverage service-based interactions between control plane (CP) network functions where identified. In a 5G system architecture, separation of the user plane (UP) functions from the control plane functions may be considered. A 5G system may provide a network function to interact with other NF(s) directly if required. A 5G system may reduce dependencies between the access network (AN) and the core network (CN). The architecture may include a converged access-agnostic core network with a common AN-CN interface that integrates different 3GPP and non-3GPP access types. A 5G system furthermore may support a unified authentication framework, stateless NFs (e.g. where the compute resource may be decoupled from the storage resource), capability exposure, and/or concurrent access to local and centralized services. To support low latency services and access to LADNs, UP functions may be deployed close to the access network.

Figure 2:
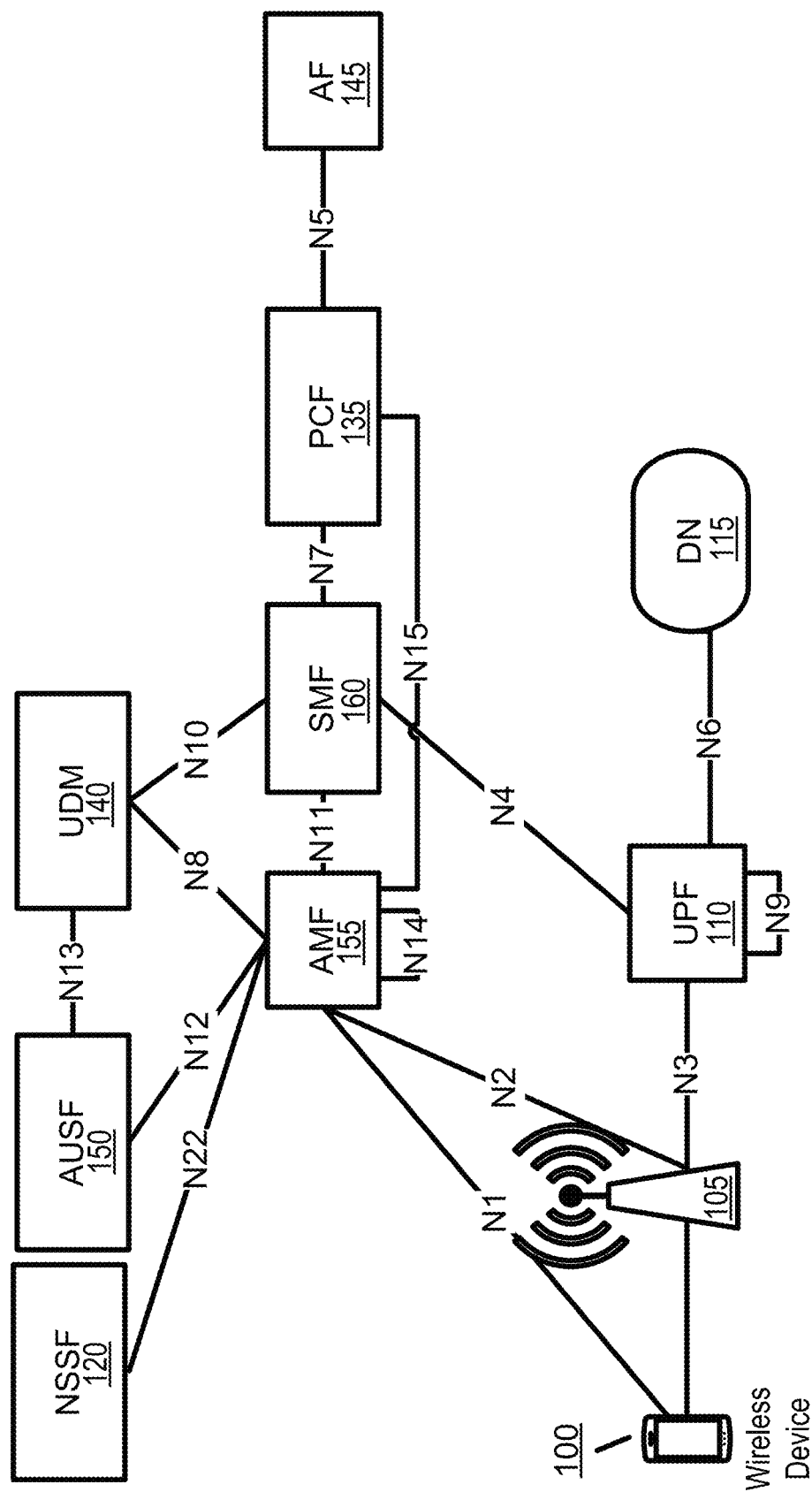
FIG. 2 shows an example 5G system architecture.

A 5G system may support roaming with both home routed traffic as well as local breakout traffic in the visited PLMN. An example 5G architecture may be service-based and the interaction between network functions may be represented in a variety of ways. FIG. 1 shows an example service-based representation, where network functions within the control plane, may provide other authorized network functions to access their services. This representation may also include point-to-point reference points where necessary. FIG. 2 shows an example reference point representation, showing the interaction between the NF services in the network functions described by point-to-point reference point (e.g. N11) between any two network functions.

Establishment of user plane connectivity to a data network via a network slice instance(s) may comprise performing a RM procedure to select an AMF 155 that supports the required network slices and establishing one or more PDU session(s) to the required data network via the network slice instance(s). The set of network slices for a wireless device 100 may be changed if the wireless device 100 may be registered with a network. The set of network slices for the wireless device 100 may be initiated by the network or the wireless device 100.

Figure 9:
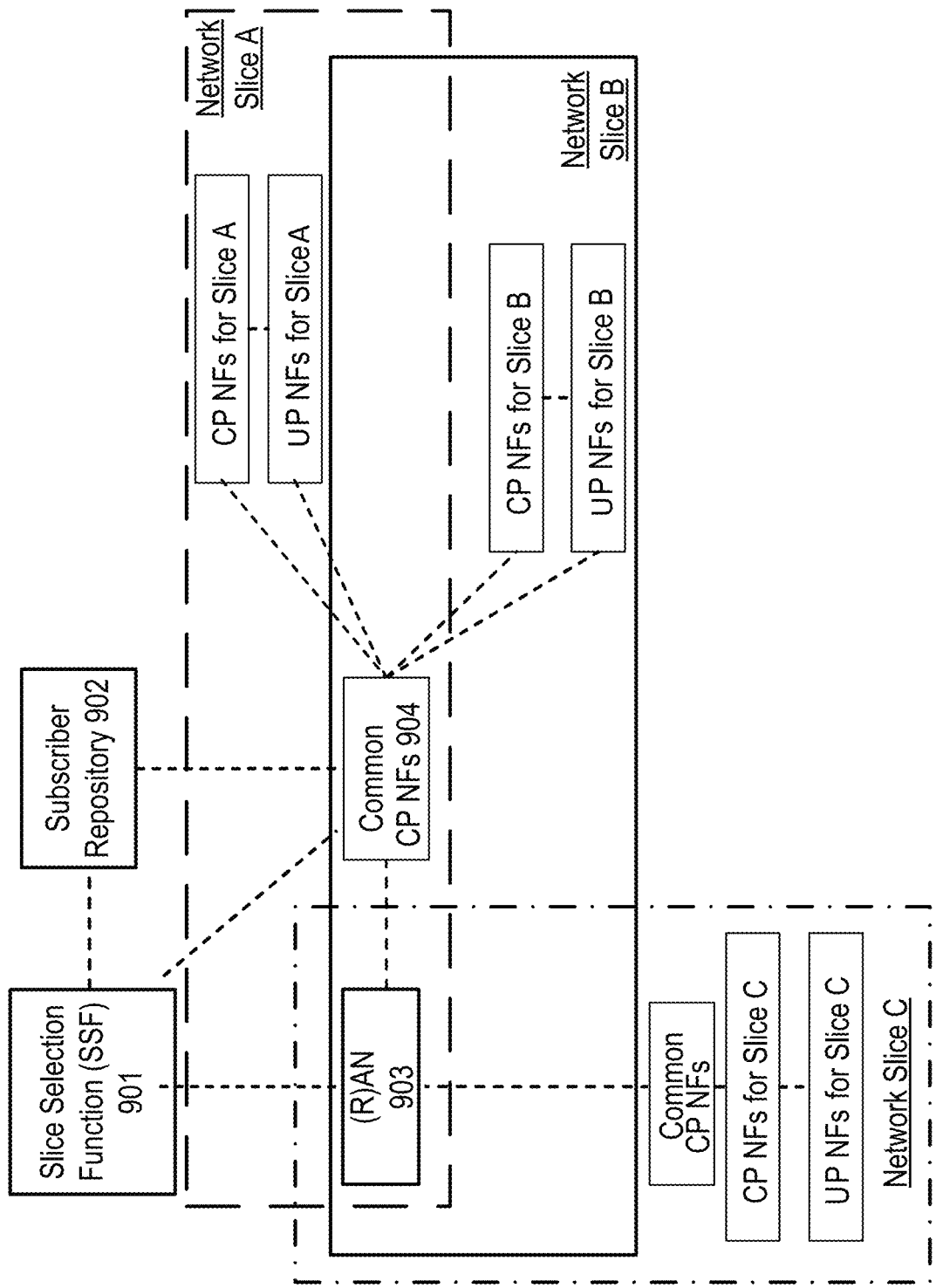
FIG. 9 shows an example of control plane interfaces for network slicing.

FIG. 9 shows an example of control plane interfaces for network slicing. Control plane network functions (CP NFs) and user plane network functions (UP NFs) are shown in FIG. 9 for slice A, slice B, and slice C. One or more (R)AN or core base stations may use a slice routing and selection function (SSF) 901 to link radio access bearer(s) of a wireless device with the corresponding core network instance(s). The subscriber repository 902 may contain subscriber profiles that may be used for authorization. The subscriber repository 902 may also include user identities and corresponding long-term credentials for authentication. The (R)AN 903 may appear as one RAT+PLMN to a wireless device and an association with network instance may be performed by the network internally. The network slices may not be visible to the wireless device. Common CP NFs 904 may be the CP entry function, which may include the mobility management function, authentication function, and/or NAS proxy function. The common CP may be shared parts among different slices. If different types of network slice perform the sharing, the required common CP function may be different for each type of network slice.

Figure 10:
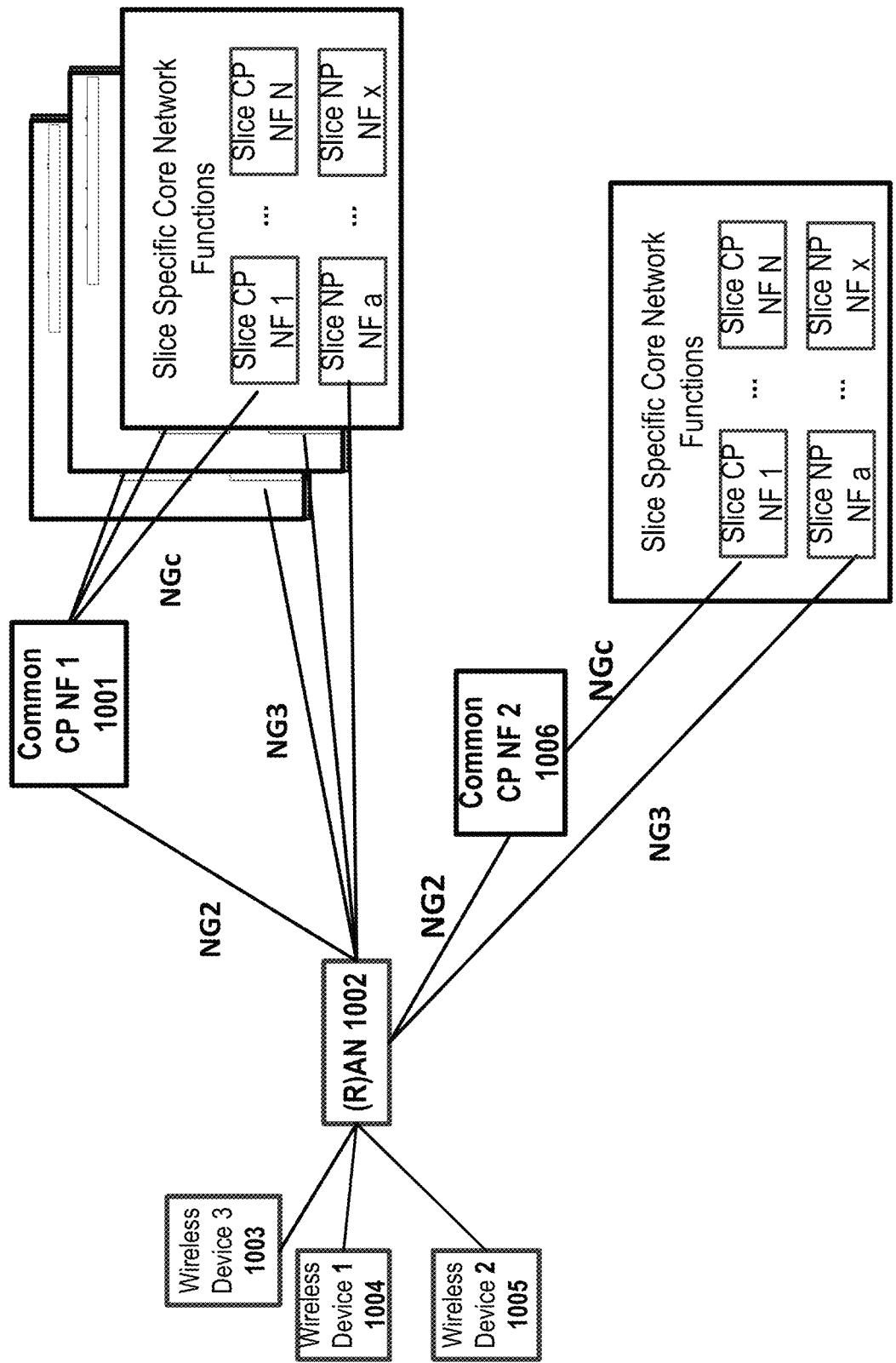
FIG. 10 shows an example of wireless devices assigned to core part of a network slice instance (NSI).

FIG. 10 shows an example depicting wireless device 1 1004, wireless device 2 1005, and wireless device 3 1003 that are assigned to a core part of network slice instances (NSI). Wireless device 1 1004, wireless device 2 1005 and wireless device 3 1003 are connected to specific core network functions via (R)AN 1002. The core network portion of the network slice may share some network functions with other core network portions of network slices that serve the same wireless device, including the NG1 and NG2 terminations, in the common control network functions (CCNF). As shown in FIG. 10, wireless device 1 1004 and wireless device 3 1003 may be assigned to common CP NF1 1001 and have three slices accessing multiple core network slice instances (NSIs) and therefore multiple slice-specific core network functions. However, it should be noted that any number of core network slice instances may be utilized. Wireless device 2 1005 may be associated with one NSI and may be assigned to different Common CP NF 2 1006 (e.g. after the wireless devices attach has occurred).

Figure 11:
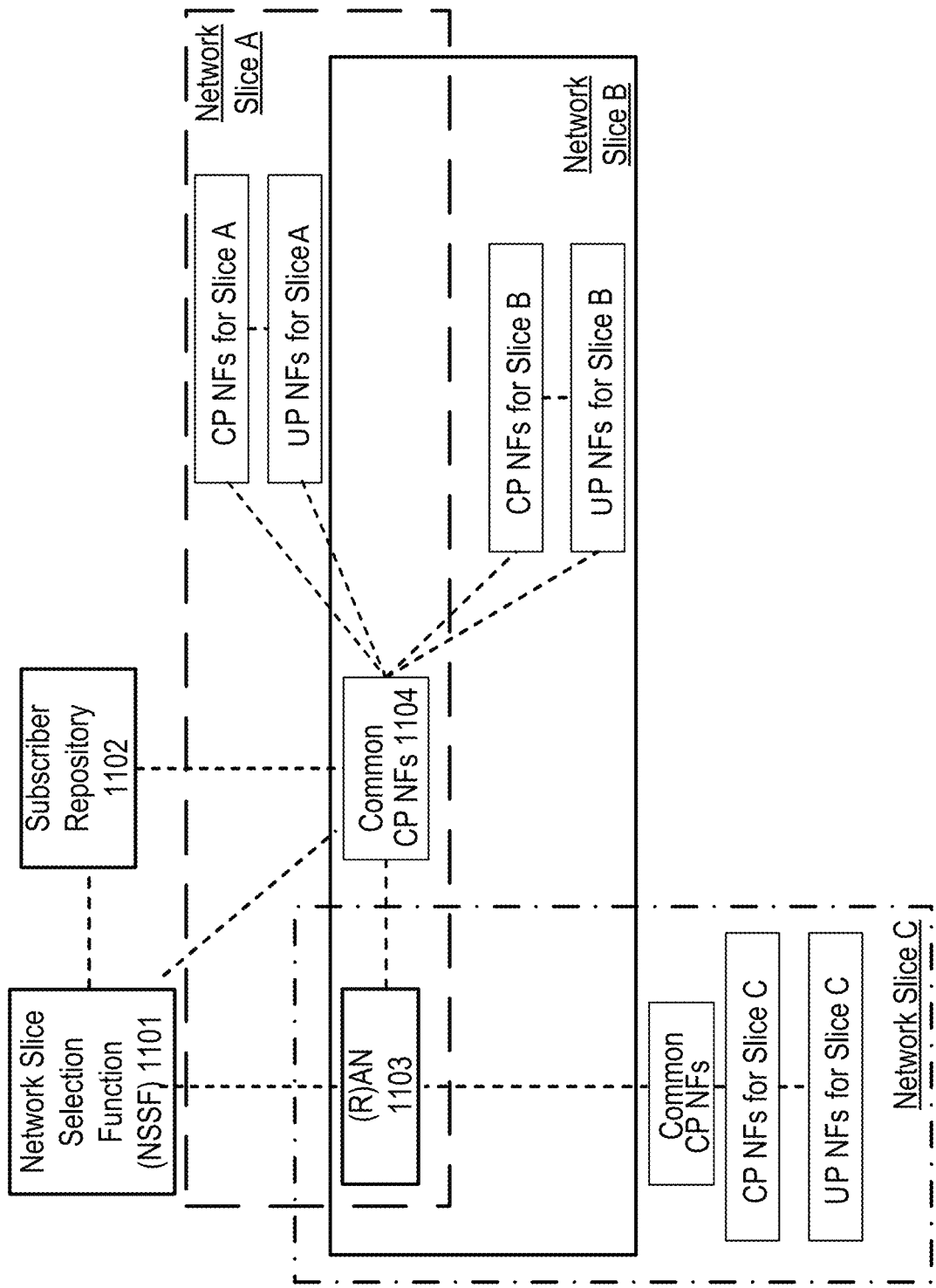
FIG. 11 shows an example of network slice architecture with two groups-common control plane (CP) network functions (NFs) and dedicated CP NFs.

The core network instances may be set up to provide a wireless device to obtain services from multiple network slices of one network operator simultaneously. A single set of CP functions that are in common among core network instances may be shared across multiple core network instances. UP functions and other CP functions that are not in common may reside in their respective core network instances, and may be not shared with other core network instances. A slice instance ID may be an identifier of a network slice instance and may be used as an indicator by the network to select the corresponding slice for a wireless device. A CP-NF ID may be an identifier of a control plane network function instance. FIG. 11 shows an example depicting a network slice architecture with two groups-common CP NFs and dedicated CP NFs. The NSSF 1101 may be common to network slices in the PLMN and may realize the slice selection function for both groups. The NSSF 1101 may store the mapping information between slice instance ID and NF ID (and/or NF address). The NSSF 1101 may have connection with the subscriber repository 1102 to get wireless device subscribed slice instance IDs corresponding to current PLMN. NSSF 1101 may obtain network slice selection policy information from a policy function. CP-NF ID and/or address may be determined by the NSSF 1101 based on slice instance ID, wireless device subscribed information, and/or network slice selection policy. NSSF may respond the specific CP-NF ID/address corresponding to the slice instance ID of the (R)AN 1103. The NSSF 1101 may be located in the core network, which may be useful for the interaction and mapping update between the NSSF 1101 and subscriber repository 1102. This may make the management of the mapping between Slice Instance ID and NF ID/address in a centralized way. The (R)AN 1103 may act as a routing function to link the wireless device with the appropriate CN part of network slice. The (R)AN 1103 may store the mapping between the Slice Instance ID and NF ID. The Common CP NFs 1104 may be used for multiple slices with wireless devices simultaneously connected. A wireless device may access multiple network slices at the same time. The Common CP NFs 1104 may have common set of NFs that may be flexibly expanded with additional NFs per slice requirement.

A wireless device may be slice-provided. If so, there may be one or more instances for the attach procedure as described herein. If wireless device attaches without Slice Instance ID, the wireless device may or may not take some assistant parameters (e.g. service type), the wireless device may or may not take some assistant parameters (e.g. service type). The (R)AN may forward the attach request to NSSF 1101. NSSF 1101 may check with subscription data and network slice selection policy and/or provide a response with a predefined/default Slice Instance ID to the wireless device. If a wireless device attaches with a Slice Instance ID, the (R)AN 1103 may not know the corresponding slice. The (R)AN 1103 may forward the wireless device request signaling to NSSF 1101 and NSSF 1101 may respond with specific CP-NF ID/address corresponding to the Slice Instance ID. The (R)AN 1103 may route the attach request to the specific CP-NF. If a wireless device attaches with a Slice Instance ID, the (R)AN 1103 may have the related mapping between the Slice Instance ID carried by the wireless device and CP-NF ID. The attach request may be routed to the specific CP-NF in the core network.

Figure 12:
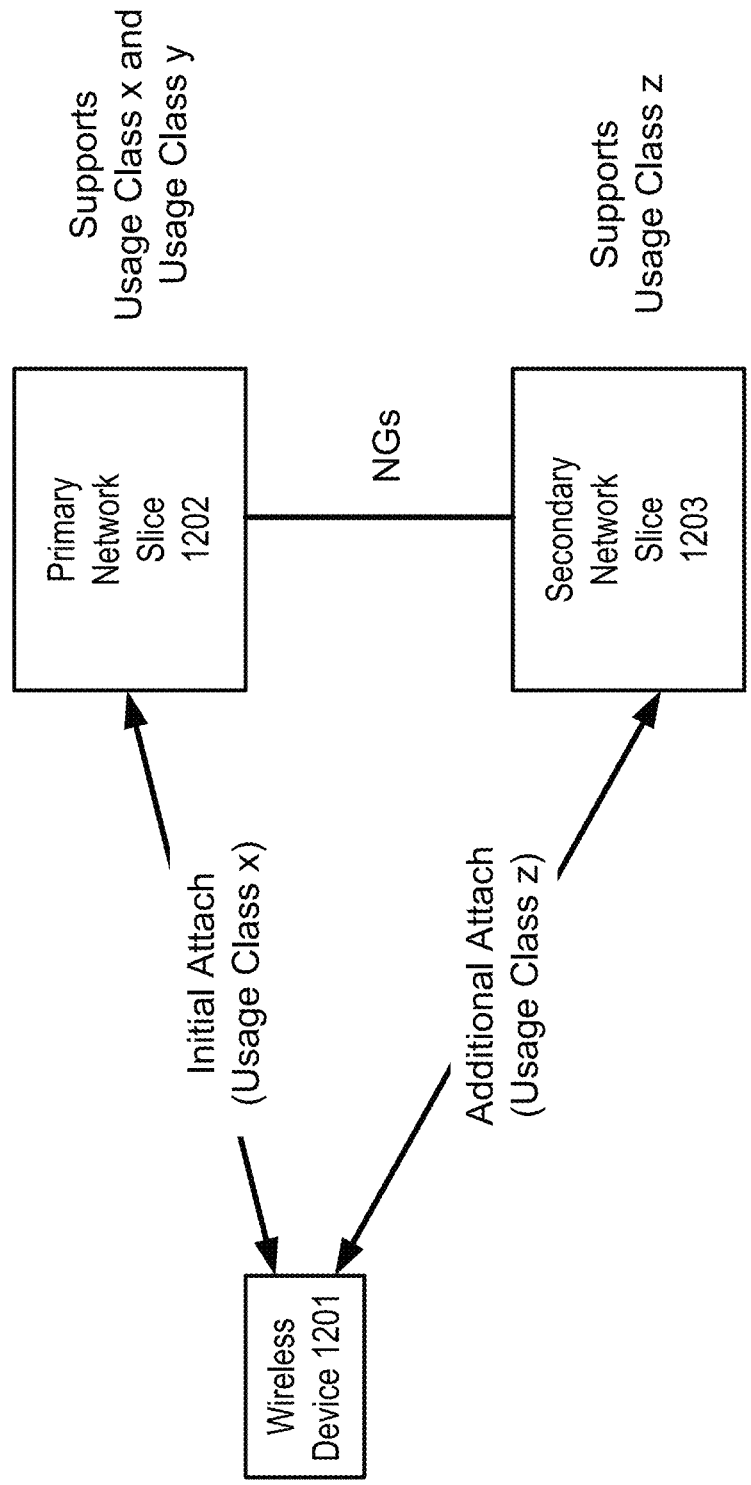
FIG. 12 shows an example of multiple network slices per wireless device.

FIG. 12 shows an example diagram depicting multiple slices per wireless device. The network slice instances may be independent and they may not share any CP or UP functions. The network slice instances may share common databases such as the subscription database and/or policy databases. Network slices instances may communicate via the NGs interface. Each network slice instance may have a unique slice identity that may be resolved to an IP address for communication via NGs. Wireless device 1201 may be simultaneously attached to multiple network slice instances. One of these slices may be the primary network slice 1202 for the wireless device and all the others may be secondary network slices 1203 for the wireless device. The first attach performed by the wireless device may be called initial attach and attaches the wireless device 1201 to the primary network slice 1202, and a subsequent attach may be called additional attach and attaches the wireless device to a secondary network slice 1203.

A Network Slice may include the Core Network CP functions, Core Network CP functions, a 5G Radio Access Network, and/or the N3IWF functions to the non-3GPP Access Network. Network slices may differ for supported features and network functions implementation. The operator may deploy multiple Network Slice instances delivering the same features but for different groups of wireless devices. The instances may deliver a different committed service and/or may be dedicated to a customer. The NSSF may store the mapping information between slice instance ID and NF ID (or NF address). A single wireless device may simultaneously be served by one or more network slice instances via a 5G-AN. A single wireless device may be served by k network slices (e.g. k=8, 16, etc.) at a time. An AMF instance serving the wireless device logically belongs to a Network Slice instances serving the wireless device. A PDU session may belong to one specific network slice instance per PLMN. Different network slice instances may not share a PDU session. Different slices may have slice-specific PDU sessions using the same DNN. A S-NSSAI (Single Network Slice Selection Assistance information) may identify a Network Slice. An S-NSSAI may be included of a slice/service type (SST) (which may refer to the expected Network Slice behavior in terms of features and services) and/or a slice differentiator (SD). A slice differentiator may be optional information that complements the slice/service type(s) to provide further differentiation for selecting a network slice instance from potentially multiple network slice instances that comply with the indicated slice/service type. This information may be referred to as SD. The same Network Slice instance may be selected employing different S-NSSAIs. The CN part of a Network Slice instance(s) serving a wireless device may be selected by CN.

Subscription data may comprise the S-NSSAI(s) of the Network Slices to which the wireless device subscribes. One or more S-NSSAIs may be marked as default S-NSSAI (e.g. k=8, 16, etc.). The wireless device may subscribe to more than eight S-NSSAI. A wireless device may be configured by the HPLMN with a configured NSSAI per PLMN. The wireless device may obtain from the AMF a Provided NSSAI for this PLMN (e.g. after successful completion of a wireless device registration procedure), which may comprise one or more S-NSSAIs. The Provided NSSAI may take precedence over the configured NSSAI for this PLMN. The wireless device may use the S-NSSAIs in the Provided NSSAI corresponding to a Network Slice for the subsequent Network Slice selection related procedures in the serving PLMN. The establishment of user plane connectivity to a data network via a network slice instance(s) may comprise performing a RM procedure to select an AMF that supports the required Network Slices and/or establishing one or more PDU session to the required Data network via the Network Slice Instance(s). If a wireless device registers with a PLMN, if the wireless device for this PLMN has a configured NSSAI or a provided NSSAI, the wireless device may provide to the network, in the Radio Resource Control (RRC) and/or NAS, a Requested NSSAI containing the S-NSSAI(s) corresponding to the slice(s) to which the wireless device attempts to register in addition to the temporary user ID, if one was assigned to the wireless device. The Requested NSSAI may be the configured-NSSAI and/or the Provided-NSSAI. If a wireless device registers with a PLMN, if for this PLMN the wireless device has no configured NSSAI or Provided NSSAI, the (R)AN may route NAS signaling from/to this wireless device to/from a default AMF.

The network, based on local policies, subscription changes, and/or wireless device mobility, may change the set of permitted Network Slice(s) to which the wireless device may be registered. The network may perform such change during a registration procedure and/or trigger a notification towards the wireless device of the change of the supported Network Slices using an RM procedure, which may trigger a registration procedure. The Network may provide the wireless device with a new Provided NSSAI and Tracking Area list. During a Registration procedure in a PLMN, if the network decides that the wireless device should be served by a different AMF based on Network Slice(s) features, the AMF that first received the Registration Request may redirect the Registration request to another AMF via the (R)AN or via direct signaling between the initial AMF and the target AMF.

The network operator may provision the wireless device with a network slice selection policy (NSSP). The NSSP may comprise one or more NSSP rules. An NSSP rule may associate an application with a certain S-NSSAI. A default rule which matches one or more applications to a S-NSSAI may also be comprised. If a wireless device application associated with a specific S-NSSAI requests data transmission, a variety of actions may be performed. If the wireless device has one or more PDU sessions established corresponding to the specific S-NSSAI, the wireless device may route the user data of this application in one of these PDU sessions, unless other conditions in the wireless device prohibit the use of these PDU sessions. If the application provides a DNN, the wireless device may consider also this DNN to determine which PDU session to use. If the wireless device does not have a PDU session established with this specific S-NSSAI, the wireless device may request a new PDU session corresponding to this S-NSSAI and with the DNN that may be provided by the application. In order for the (R)AN to select a proper resource for supporting network slicing in the (R)AN, (R)AN may be aware of the Network Slices used by the wireless device.

The AMF may select a SMF in a Network Slice instance based on S-NSSAI, DNN and other information, such as wireless device subscription and/or local operator policies, if the wireless device triggers the establishment of a PDU session. The selected SMF may establish a PDU session based on S-NSSAI and DNN. In order to support network-controlled privacy of slice information for the slices the wireless device accesses if the wireless device may be aware or configured that privacy considerations apply to NSSAI, the wireless device might not comprise NSSAI in NAS signaling unless the wireless device has a NAS security context and/or the wireless device might not comprise NSSAI in unprotected RRC signaling. For roaming scenarios, the Network Slice specific network functions in VPLMN and HPLMN may be selected based on the S-NSSAI provided by the wireless device during PDU connection establishment. If a standardized S-NSSAI may be used, selections of slice specific NF instances may be done by each PLMN based on the provided S-NSSAI. Additionally, the VPLMN may map the S-NSSAI of HPLMN to a S-NSSAI of VPLMN based on roaming agreement (comprising mapping to a default S-NSSAI of VPLMN). The selection of slice specific NF instance in VPLMN may be based on the S-NSSAI of VPLMN and/or the S-NSSAI of HPLMN.

The 5G system may provide an operator to configure the information that may associate a service to a network slice. Operators may use network slicing implementation to support multiple third parties (e.g. enterprises, service providers, content providers, etc.) that may require similar network characteristics. A business application layer may contain specific applications and services of the operator, enterprise, verticals, and/or third parties that utilize a 5G network. The interface to the end-to-end management and orchestration entity may provide dedicated network slices for an application and/or a mapping of an application to existing network slices. A 5G system may support network slicing for specific applications. Legacy solutions may not support application initiated network slicing. This may cause an interworking problem between the wireless device and the application server for different vendors that may have different implementations for a network slicing initiation. A variety of mechanisms may be provided for an application to trigger the establishment of dedicated network slices.

If a wireless device has registered to a 5G network, both the wireless device and network may initiate the PDU sessions. For the network initiated PDU session establishment procedure, the network may send a device trigger message to the application(s) on the wireless device side. The trigger payload may be comprised in Device Trigger Request message containing the information on which application on the wireless device side may be expected to trigger the PDU Session establishment request. Based on that information, the application(s) on the wireless device may trigger the PDU session establishment procedure. An application function AF may transmit the network slicing related information to the PCF. AF may transmit to PCF a request. The request may comprise at least information to identify the traffic to be routed. The traffic may be identified in the AF request by: a DNN and possibly slicing information (S-NSSAI) and/or an AF-Service-Identifier. If the AF provides an AF-Service-Identifier, such as an identifier of the service on behalf of which the AF may be issuing the request, the 5GC may map this identifier into a target DNN and slicing information (5-NSSAI). One or more of the following may be implemented to initiate and/or establish a new slice by an application: the PCF and/or NEF may receive from AF a message comprising network slicing information, the PCF and/or NEF may trigger the network slicing establishment procedure, and/or the AF may be the application function of the operator or a third party application server (e.g. vertical industrial application server). If the third party application does not support the AF, the third party application may request the AF as a sponsor, which may be transparent to the PCF and/or NEF.

The network slicing information may comprise a variety of information elements. Network slicing required information indicates the application requires a dedicated network slice. Without this indication, the operator network might not know whether to reuse the current slice or establish a new one. Required bandwidth information (e.g. minimal bandwidth) for the network slice may describe the bandwidth to support the service and/or a measure of priority for the bandwidth (e.g., the bandwidth may be guaranteed for medical applications). Provided latency information for the network slice may describe the particular service level needed to support the service (e.g. for the time sensitive application Video, VoIP etc.). Priority information for the network slice may be used to allocate priority for network resources (e.g. higher priority network slices (e.g. emergency services) may have the priority on the resource allocation) and/or preempt existing lower priority network slices if the requested resource may be limited. Third party ID and third party charging information may be used to identify a third party and/or indicate that the service may be free of charge for the wireless device but incur a charge for the third party (and vice versa). S-NSSAI or an AF-Service-Identifier information may comprise a Slice/Service type (SST) and a Slice Differentiator (SD) that may indicate expected Network Slice behavior in terms of features and services. The AF-Service-Identifier may be the identifier of the service.

If the PDU session is also required at the same time, the AF may also provide the following information to the PCF or NEF: the service data flow information may be IP 5-Tuple (i.e. Source IP address, Destination IP Address, Source Port number, Destination Port Number and the protocol in use) or Application Identifier (e.g. Skype), the user identity may be the wireless device IPv4 address or IPv6 prefix, the wireless device NAI, etc., and/or the APN ID may be to identify a specific PDN.

There may be a variety of roaming scenarios including, e.g. if the AF may be located in the home PLMN (HPLMN) or if the AF may be located in the visited PLMN (VPLMN). One or more of the following may be implemented to initiate and/or establish a new slice by an application: the HPCF/VPCF and/or HNEF/VNEF may receive from HAF/VAF a message including network slicing information, the HPCF/VPCF and/or HNEF/VNEF may trigger the network slicing establishment procedure, and the HAF/VAF may be the application function of the operator or a third party application server (e.g. vertical industrial application server). If the third party application does not support the AF, the third party application may request the HAF/VAF as a sponsor, which may be transparent to the HPCF/VPCF and/or HNEF/VNEF.

A HAF may initiate and establish a new network slice, and a network slice ID may be allocated by a VPCF.

Figure 13:
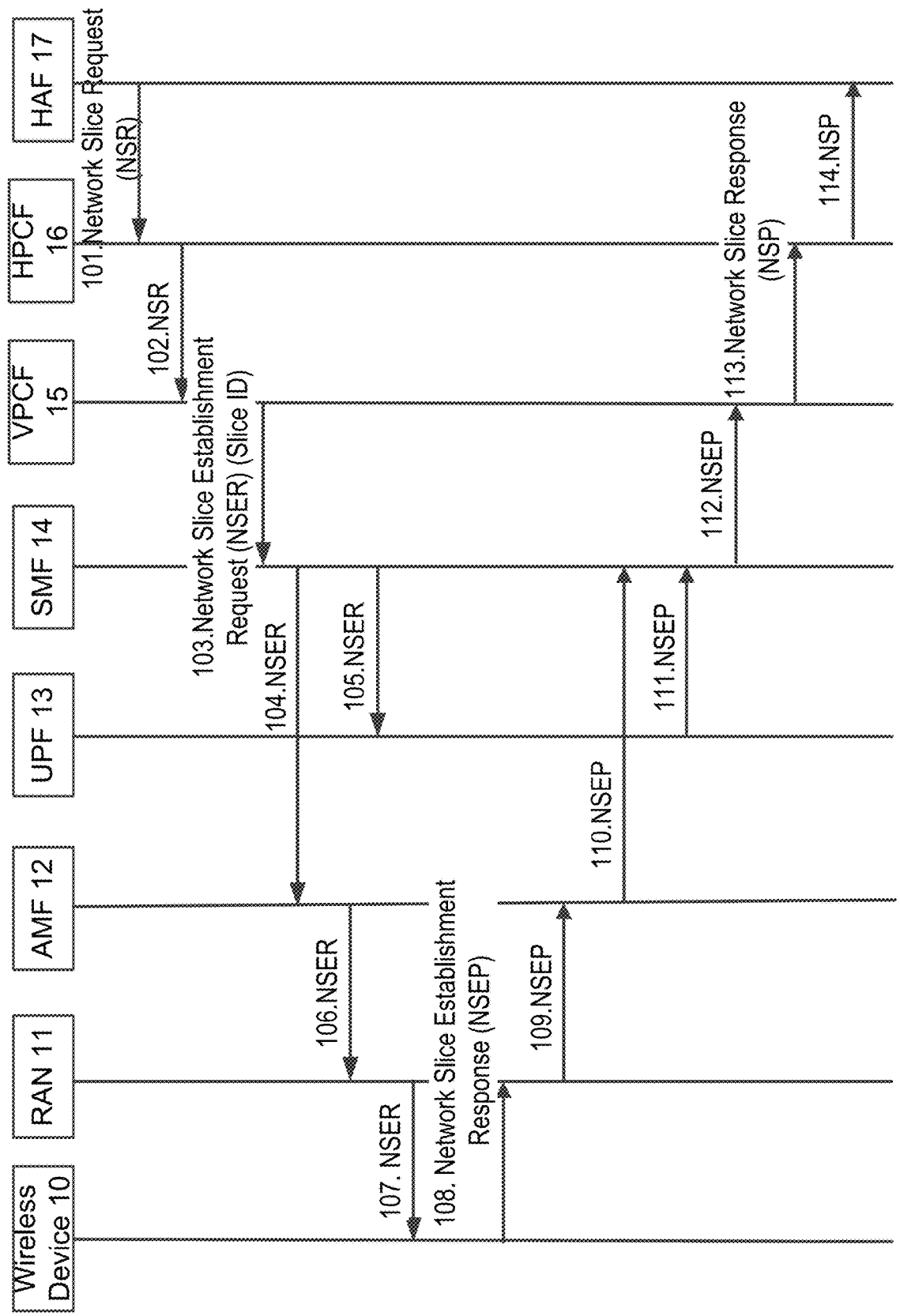
FIG. 13 shows an example for initiating a new network slice using a home application function (HAF).

FIG. 13 shows an example for initiating a new network slice using a HAF. At step 101, a HAF 17 may transmit to a HPCF 16 a message (e.g. network slice request message) including network slicing information. The HAF 17 may transmit the message based on a request to establish a network slice to meet one or more service requirements. The HAF 17 may be the application function of the operator or a third party application server (e.g. vertical industrial application server). If the third party application does not support the AF, it may request the HAF 17 as the sponsor, which may be transparent to the HPCF 16. The network slicing information may include one or more of the following information elements: the network slicing required indication, the required minimal bandwidth of the network slice, the allowed latency of the network slice, the priority of the network slice, the third party ID and third party charging indication, the S-NSSAI, or an AF-Service-Identifier. If the PDU session may be required at the same time, the HAF 17 may provide some or all of the following information to the HPCF 16: the service data flow information, the user identity, and/or the APN identity.

At step 102, based on receiving the network slice request message from the HAF 17, the HPCF 16 may perform at least one of the following actions. A policy decision may be made based on the information from the HAF 17, the information from the UDM, and/or the pre-configured policy in the HPCF 16. The policy may apply for the slice which may include the QoS policy (e.g. the required minimal bandwidth of the network slice), charging policy (e.g. third party charging), the priority of the network slice, Packet Inspection policy, and/or Packet Routing policy etc. A message (e.g. network slice request message) may be sent to a VPCF 15 including one or more of the following information: the network slicing information, the policy, or the S-NSSAI. The message may include the service data flow information, the user identity, and/or the APN identity, if applicable.

At step 103, based on receiving the network slice request message from the HPCF 16, the VPCF 15 may perform at least one of the following actions. A network slice ID may be created or generated. The network slice ID may identify a network slice. The network slice ID maybe per wireless device, per PLMN, or per operator. The network slice ID may unique be per wireless device, per PLMN, or per operator. The network slice ID may be unique per PLMN and uniqueness may be guaranteed. A message (e.g. network slice establishment request message) may be sent to a SMF 14 including one or more of the following information: the network slicing information, the network slice ID, the policy, or the S-NSSAI. The message may include the service data flow information, the user identity, and/or the APN identity, if applicable.

At step 104, the SMF 14 may perform one or more of the following actions (e.g. after receiving the network slice establishment request message from the VPCF 15): allocate the CN Tunnel Info, allocate the PDU session ID if the PDU session may be established together with the network slice establishment, and/or send a message (e.g. network slice establishment request message) to an AMF 12 including one or more of the following information: the network slicing information, the network slice ID, the policy, or the S-NSSAI. The message may include the service data flow information, the user identity, the APN identity, and/or PDU session ID, if applicable. If the charging policy is received from the VPCF 15, the SMF 14 may perform the charging function (e.g. collecting the data or time usage of the user and reporting the usage to the OCS and/or OFCS). If the SMF 14 has received the third party charging indication, the SMF 14 may perform one or more of the following actions: send CDR or charging message to the visited OCS and/or OFCS, the visited OCS and/or OFCS may send the CDR or charging message to the home OCS and/or OFCS, the visited and/or home OCS and/or OFCS may perform the charging for the third party and not charging for the user. The SMF 14 may send CDR or charging message to the home OCS and/or OFCS, and/or the home OCS and/or OFCS may perform the charging for the third party and not charging for the user.

At step 105, the SMF 14 may send to a UPF 13 a message (e.g. network slice establishment request) to establish the user plane including one or more of the following information: the network slicing information, the network slice ID, the policy, or the S-NSSAI. The message may also include the service data flow information, the user identity, the APN identity, and/or PDU session ID, if applicable. At step 106, the AMF 12 may send to a RAN 11 a message (e.g. network slice establishment request) including one or more of the following information: the network slicing information, the network slice ID, the policy, or the S-NSSAI. The message may also include the service data flow information, the user identity, the APN identity, and/or PDU session ID, if applicable. At step 107, the RAN 11 may send to a wireless device 10 a message (e.g. network slice establishment request) including one or more of the following information: the network slicing information, the network slice ID, the policy, or the S-NSSAI. The message may include the service data flow information, the APN identity, and/or PDU session ID, if applicable. At step 108, the wireless device 10 may acknowledge the RAN 11 by sending a response message (e.g. network slice establishment response). At step 109, the RAN 11 may acknowledge the AMF 12 by sending a response message (e.g. network slice establishment response). At step 110, the AMF 12 may acknowledge the SMF 14 by sending a response message (e.g. network slice establishment response). At step 111, the UPF 13 may acknowledge the SMF 14 by sending a response message (e.g. network slice establishment response). The SMF 14 may receive the response from the UPF 13 before receiving the response from the AMF 12. At step 112, the SMF 14 may acknowledge the VPCF 15 by sending a response message (e.g. network slice establishment response). At step 113, the VPCF 15 may acknowledge the HPCF 16 by sending a response message (e.g. network slice response). At step 114, the HPCF 16 may acknowledge the HAF 17 by sending a response message (e.g. network slice response). The application service may be performed on the slice between the application and the wireless device, e.g. after the slice may be established successfully. A HAF may connect with a HNEF, the HAF may initiate and establish a new network slice, and a network slice ID may be allocated by a VPCF.

Figure 14:
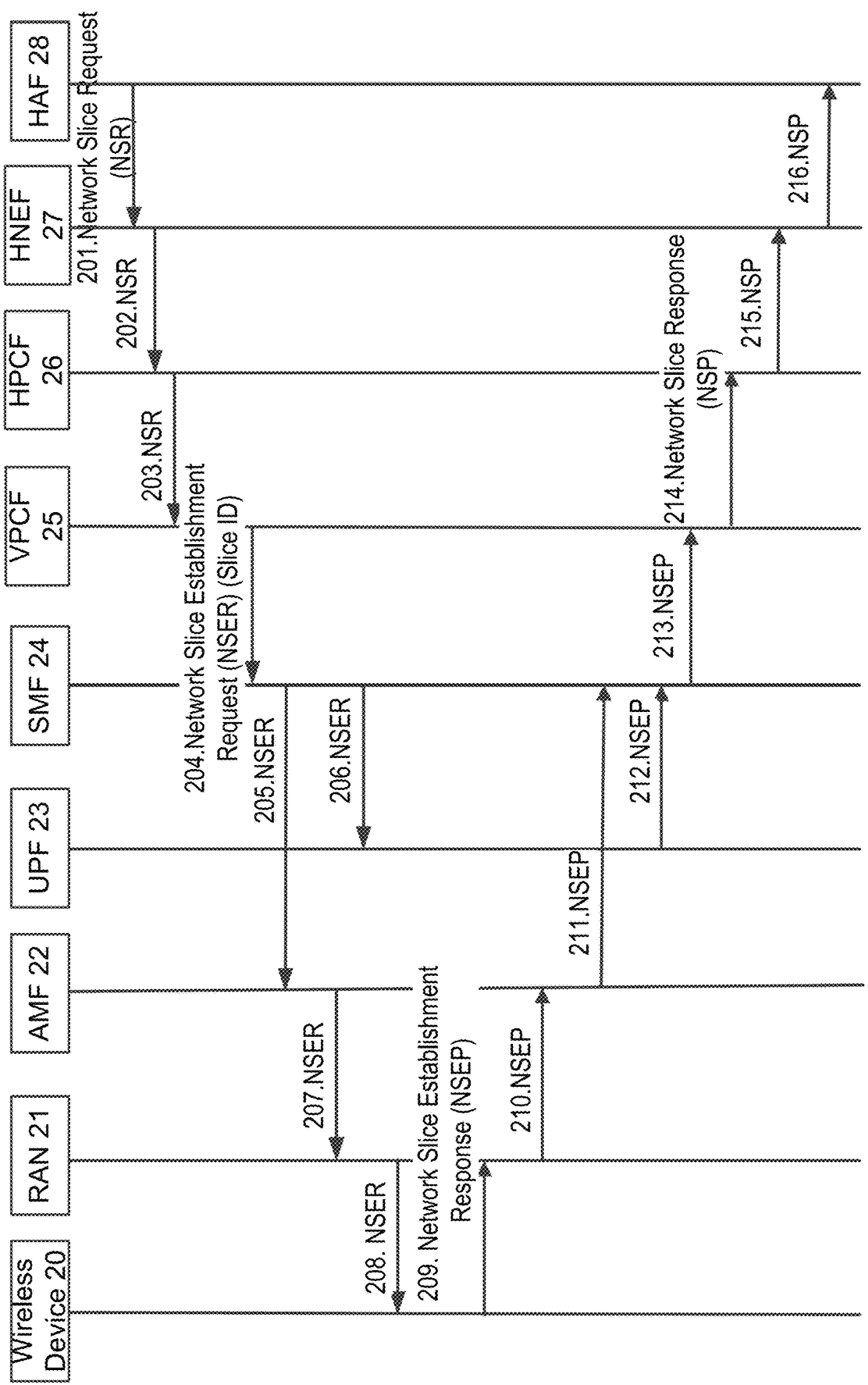
FIG. 14 shows an example for initiating and establishing a network slice via a home network exposure function (HNEF).

FIG. 14 shows an example for initiating and establishing a network slice via a HNEF. At step 201, a HAF 28 may transmit to a HNEF 27 a message (e.g. network slice request message) including network slicing information. The HAF 28 may transmit the message based on a request to establish a network slice to meet one or more service requirements. The HAF 28 may be the application function of the operator, or a third party application server (e.g. vertical industrial application server). If the third party application does not support the AF, it may request the HAF 28 as the sponsor, which may be transparent to the HNEF 27. The network slicing information may include one or more of the following information elements: the network slicing required indication, the required minimal bandwidth of the network slice, the allowed latency of the network slice, the priority of the network slice, the third party ID and third party charging indication, the S-NSSAI, or an AF-Service-Identifier. If the PDU session may be required at the same time, the HAF 28 may provide some or all of the following information to the HNEF 27: the service data flow information, the user identity, and/or the APN identity.

At step 202, HNEF 27 may send to the HPCF 26 a message (e.g. network slice request message) including the information received from the HAF 28. The HNEF 27 may check whether the application may be authorized to initiate and/or request a network slice, e.g. before the HNEF 27 sends the message to the HPCF 26. At step 203, based on receiving the network slice request message from the HNEF 27, the HPCF 26 may perform at least one of the following actions. A policy decision may be made based on the information from the HNEF 27, the information from the UDM, or the pre-configured policy in the HPCF 26, in which the policy may apply for the slice, which may include the QoS policy (e.g. the required minimal bandwidth of the network slice), charging policy (e.g. third party charging), the priority of the network slice, Packet Inspection policy, and/or packet routing policy. A message (e.g. network slice request message) may be sent to a VPCF 25 including one or more of the following information: the network slicing information, the policy, and the S-NSSAI. The message may also include the service data flow information, the user identity and/or the APN identity if applicable.

At step 204, based on receiving the network slice request message from the HPCF 26, the VPCF 25 may perform at least one of the following actions. A network slice ID may be created or generated. The network slice ID may identify a network slice. The network slice ID may be per wireless device, per PLMN, and/or per operator. The network slice ID may unique be per wireless device, per PLMN, or per operator and uniqueness may be guaranteed. A message (e.g. network slice establishment request message) may be sent to a SMF 24 a message including one or more of the following information: the network slicing information, the network slice ID, the policy, or the S-NSSAI. The message may include the service data flow information, the user identity, and the APN identity, if applicable. At step 205, the SMF 24 may perform one or more of the following actions (e.g., after receiving the network slice establishment request message from the VPCF 25): allocate the CN Tunnel Info, allocate the PDU session ID if the PDU session may be established together with the network slice establishment, or send a message (e.g. network slice establishment request message) to an AMF 22 including one or more of the following information: the network slicing information, the network slice ID, the policy, or the S-NSSAI. The message may include the service data flow information, the user identity, the APN identity, and/or PDU session ID, if applicable. If the charging policy is received from the VPCF 25, the SMF 24 may perform the charging function (e.g. collecting the data or time usage of the user and reporting the usage to the OCS and/or OFCS). If the SMF 24 has received the third party charging indication, the SMF 24 may perform one or more of the following actions: the SMF 24 may send CDR or charging message to the visited OCS and/or OFCS, the visited OCS and/or OFCS may send the CDR or charging message to the home OCS and/or OFCS, the visited and/or home OCS and/or OFCS may perform the charging for the third party and not charging for the user and/or the SMF 24 may send CDR or charging message to the home OCS and/or OFCS, or the home OCS and/or OFCS may perform the charging for the third party and not charging for the user.

At step 206, the SMF 24 may send to a UPF 23 a message (e.g. network slice establishment request) to establish the user plane including one or more of the following information: the network slicing information, the network slice ID, the policy, and/or the S-NSSAI. The message may include the service data flow information, the user identity, the APN identity, and/or PDU session ID, if applicable. At step 207, the AMF 22 may send to a RAN 21 a message (e.g. network slice establishment request) including one or more of the following information: the network slicing information, the network slice ID, the policy, or the S-NSSAI. The message may include the service data flow information, the user identity, the APN identity, and/or PDU session ID, if applicable. At step 208, the RAN 21 may send to a wireless device 20 a message (e.g. network slice establishment request) including one or more of the following information: the network slicing information, the network slice ID, the policy, or the S-NSSAI. The message may also include the service data flow information, the APN identity, and/or PDU session ID, if applicable. At step 209, the wireless device 20 acknowledges the RAN 21 by sending a response message (e.g. network slice establishment response). At step 210, the RAN 21 may acknowledge the AMF 22 by sending a response message (e.g. network slice establishment response). At step 211, the AMF 22 may acknowledge the SMF 24 by sending a response message (e.g. network slice establishment response). At step 212, the UPF 23 may acknowledge the SMF 24 by sending a response message (e.g. network slice establishment response). The SMF 24 may receive the response from the UPF 23 before receiving the response from the AMF 22. At step 213, the SMF 24 may acknowledge the VPCF 25 by sending a response message (e.g. network slice establishment response). At step 214, the VPCF 25 may acknowledge the HPCF 26 by sending a response message (e.g. network slice response). At step 215, the HPCF 26 may acknowledge the HNEF 27 by sending a response message (e.g. network slice response). At step 216, the HNEF 27 may acknowledge the HAF 28 by sending a response message (e.g. network slice response). The application service may be performed on the slice between the application and the wireless device (e.g. after the slice may be established successfully). A VAF may be located in the visited PLMN, and it may initiate and establish a new network slice, and a network slice ID may be allocated by a VPCF.

Figure 15:
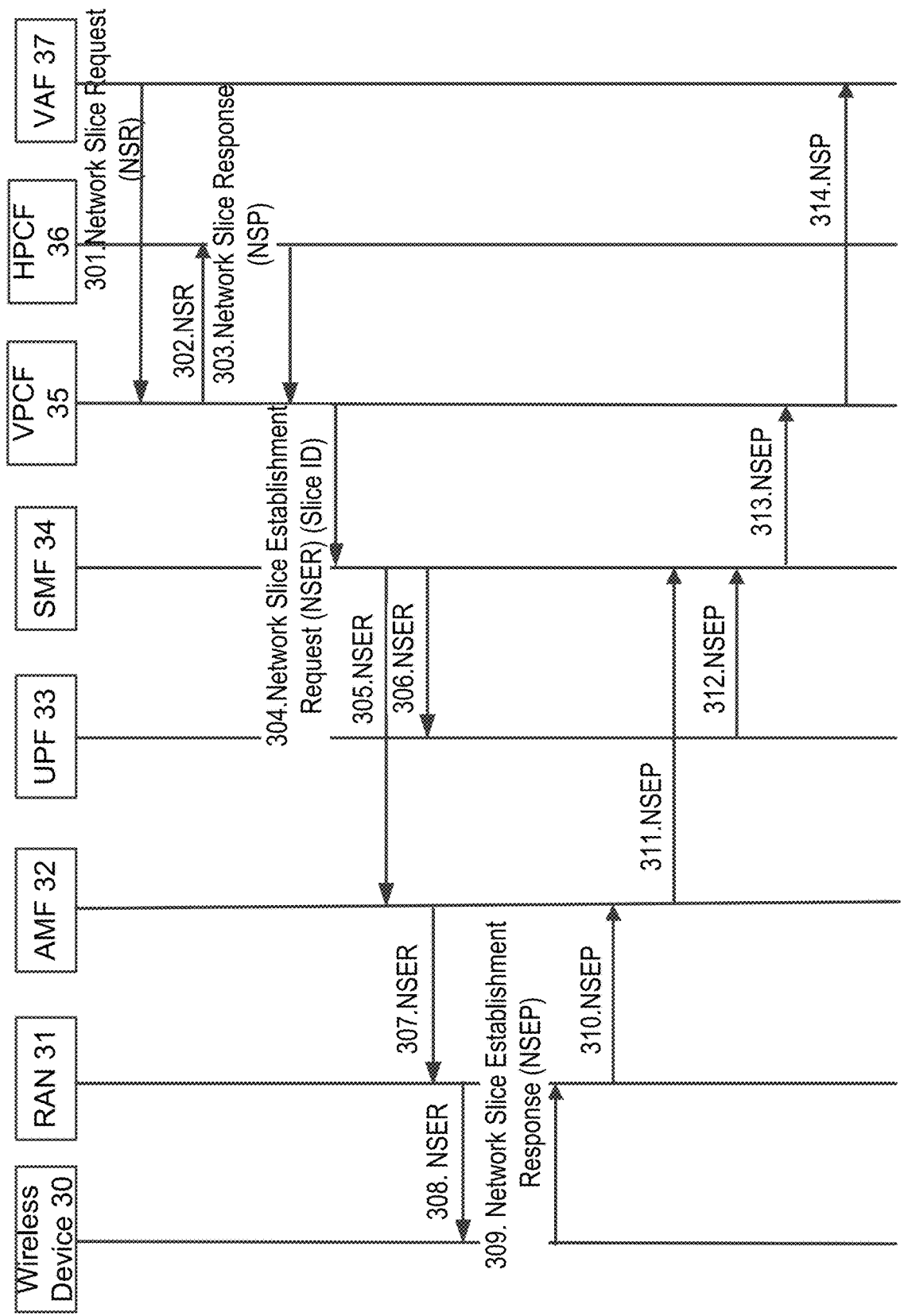
FIG. 15 shows an example of initiating and establishing a network slice located in the visited PLMN.

FIG. 15 shows an example of initiating and establishing a network slice located in the VPLMN. At step 301, a VAF 37 may transmit to a VPCF 35 a message (e.g. network slice request message) including network slicing information. The VAF 37 may transmit the message based on a request to establish a network slice to meet one or more service requirements. The VAF 37 may be the application function of the operator, or a third party application server (e.g. vertical industrial application server). If the third party application does not support the AF, it may request the VAF 37 as the sponsor, which may be transparent to the VPCF 35. The network slicing information may include one or more of the following information elements: the network slicing required indication, the required minimal bandwidth of the network slice, the allowed latency of the network slice, the priority of the network slice, the third party ID and third party charging indication, the S-NSSAI, or an AF-Service-Identifier. If the PDU session may be required at the same time, the VAF 37 may provide some or all of the following information to the HPCF 36: the service data flow information, the user identity, and/or the APN identity.

At step 302, based on receiving the network slice request message from the VAF 37, the VPCF 35 may perform at least one of the following actions. A network slice ID may be created or generated. The network slice ID may identify a network slice. The network slice ID may be per wireless device, per PLMN, or per operator. The network slice ID may unique be per wireless device, per PLMN, or per operator. The network slice ID may be unique per PLMN and uniqueness may be guaranteed. A message (e.g. network slice request message) may be sent to a HPCF 36 including one or more of the following information: the network slicing information, the network slice ID, or the S-NSSAI. The message may also include the service data flow information, the user identity, and/or the APN identity, if applicable.

At step 303, based on receiving the network slice request message from the VPCF 35, the HPCF 36 may perform at least one of the following actions: make the policy decision based on the information from the VPCF 35, the information from the UDM, or the pre-configured policy in the HPCF 36 in which the policy may apply for the slice, which may include the QoS policy (e.g. the required minimal bandwidth of the network slice), charging policy (e.g. third party charging), the priority of the network slice, Packet Inspection policy and/or Packet Routing policy, and/or send to an VPCF 35 a message (e.g. network slice response message) including one or more of the following information: the network slicing information, the network slice ID, the policy, or the S-NSSAI. The message may include the service data flow information, the user identity, and the APN identity, if applicable.

At step 304, the VPCF 35 may send to an SMF 34 a message (e.g. network slice establishment request message) including one or more of the following information: the network slicing information, the network slice ID, the policy, or the S-NSSAI. The message may also include the service data flow information, the user identity, and the APN identity, if applicable. At step 305, the SMF 34 may perform one or more of the following actions (e.g. after receiving the network slice establishment request message from the VPCF 35): allocate the CN Tunnel Info, allocate the PDU session ID if the PDU session may be established together with the network slice establishment, send a message (e.g. network slice establishment request message) to an AMF 32 including one or more of the following information: the network slicing information, the network slice ID, the policy, or the S-NSSAI. The message may also include the service data flow information, the user identity, the APN identity, and/or PDU session ID, if applicable. If the charging policy is received from the VPCF 35, the SMF 34 may perform the charging function (e.g. collecting the data or time usage of the user and reporting the usage to the OCS and/or OFCS). If the SMF 34 has received the third party charging indication, the SMF 34 may perform one or more of the following actions: the SMF 34 may send CDR or charging message to the visited OCS and/or OFCS, the visited OCS and/or OFCS may send the CDR or charging message to the home OCS and/or OFCS, or the visited and/or home OCS and/or OFCS may perform the charging for the third party and not charging for the user. The SMF 34 may send CDR or charging message to the home OCS and/or OFCS, the home OCS and/or OFCS may perform the charging for the third party and not charging for the user.

At step 306, the SMF 34 may send to a UPF 33 a message (e.g. network slice establishment request) to establish the user plane including one or more of the following information: the network slicing information, the network slice ID, the policy, or the S-NSSAI. The message may also include the service data flow information, the user identity, the APN identity, or PDU session ID, if applicable. At step 307, the AMF 32 may send to a RAN 31 a message (e.g. network slice establishment request) including one or more of the following information: the network slicing information, the network slice ID, the policy, r the S-NSSAI. The message may include the service data flow information, the user identity, the APN identity, and/or PDU session ID, if applicable. At step 308, the RAN 31 may send to a wireless device 30 a message (e.g. network slice establishment request) including one or more of the following information: the network slicing information, the network slice ID, the policy, or the S-NSSAI. The message may also include the service data flow information, the APN identity, and/or PDU session ID, if applicable. At step 309, the wireless device 30 may acknowledge the RAN 31 by sending a response message (e.g. network slice establishment response). At step 310, the RAN 31 may acknowledge the AMF 32 by sending a response message (e.g. network slice establishment response). At step 311, the AMF 32 may acknowledge the SMF 34 by sending a response message (e.g. network slice establishment response). At step 312, the UPF 33 may acknowledge the SMF 34 by sending a response message (e.g. network slice establishment response). The SMF 34 may receive the response from the UPF 33 before receiving the response from the AMF 32. At step 313, the SMF 34 may acknowledge the VPCF 35 by sending a response message (e.g. network slice establishment response). At step 314, the VPCF 35 may acknowledge the VAF 37 by sending a response message (e.g. network slice response). The application service may be performed on the slice between the application and the wireless device (e.g. after the slice may be established successfully). A VAF may be located in the visited PLMN and may connect with a VNEF. The VAF may initiate and establish a new network slice, and a network slice ID may be allocated by a VPCF.

Figure 16:
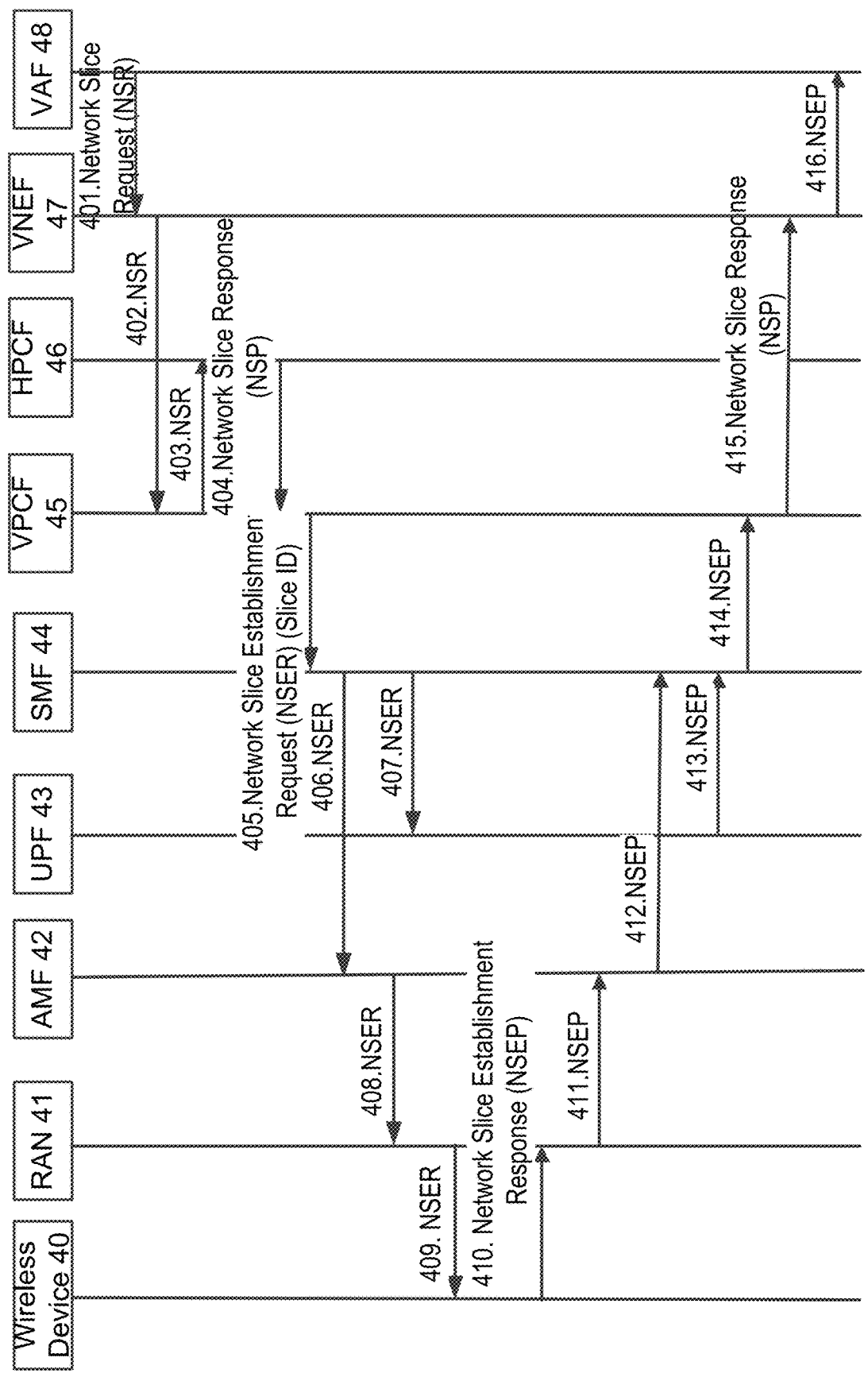
FIG. 16 shows an example of initiating and establishing a network slice using a visited application function (VAF).

FIG. 16 shows an example of initiating and establishing a network slice using a VAF. At step 401, a VAF 48 may transmit to a VNEF 47 a message (e.g. network slice request message) including network slicing information. The VAF 48 may transmit the message based on a request to establish a network slice to meet one or more service requirements. The VAF 48 may be the application function of the operator, or a third party application server (e.g. vertical industrial application server). If the third party application does not support the AF, it may request the VAF 48 as the sponsor, which may be transparent to the VNEF 47. The network slicing information may include one or more of the following information elements: the network slicing required indication, the required minimal bandwidth of the network slice, the allowed latency of the network slice, the priority of the network slice, the third party ID and third party charging indication, the S-NSSAI, or an AF-Service-Identifier. If the PDU session may be also required at the same time, the VAF 48 may provide some or all of the following information to the VNEF 47: the service data flow information, the user identity, and/or the APN identity.

At step 402, VNEF 47 may send to the VPCF 45 a message (e.g. network slice request message) including the information received from the VAF 48. The VNEF 47 may check whether the application may be authorized to initiate and/or request a network slice. At step 403, the VPCF 45 may perform at least one of the following actions, e.g. based on receiving the network slice request message from the VNEF 47. First, a network slice ID may be created or generated. The network slice ID may identify a network slice. The network slice ID may be per wireless device, per PLMN, or per operator. The network slice ID may unique be per wireless device, per PLMN, or per operator. The network slice ID may be unique per PLMN and uniqueness may be guaranteed. A message (e.g. network slice request message) may be sent to HPCF 46 including one or more of the following information: the network slicing information, the network slice ID, or the S-NSSAI. The message may include the service data flow information, the user identity, and/or the APN identity, if applicable.

At step 404, the HPCF 46 may perform at least one of the following actions, e.g. based on receiving the network slice request message from the VPCF 45: make the policy decision based on the information from the VPCF 45, the information from the UDM, or the pre-configured policy in the HPCF 46 in which the policy may apply for the slice, which may include the QoS policy (e.g. the required minimal bandwidth of the network slice), charging policy (e.g. third party charging), the priority of the network slice, Packet Inspection policy and/or Packet Routing policy, and/or send to an VPCF 45 a message (e.g. network slice response message) including one or more of the following information: the network slicing information, the network slice ID, the policy, or the S-NSSAI. The message may include the service data flow information, the user identity, and the APN identity, if applicable.

At step 405, the VPCF 45 may send to an SMF 44 a message (e.g. network slice establishment request message) including one or more of the following information: the network slicing information, the network slice ID, the policy, or the S-NSSAI. The message may include the service data flow information, the user identity, and the APN identity, if applicable. At step 406, the SMF 44 may perform one or more of the following actions (e.g. after receiving the network slice establishment request message from the VPCF 45): allocate the CN Tunnel Info, allocate the PDU session ID if the PDU session may be established together with the network slice establishment, send a message (e.g. network slice establishment request message) to an AMF 42 including one or more of the following information: the network slicing information, the network slice ID, the policy, or the S-NSSAI. The message may include the service data flow information, the user identity, the APN identity, and/or PDU session ID, if applicable. If the charging policy is received from the VPCF 45, the SMF 44 may perform the charging function (e.g. collecting the data or time usage of the user and reporting the usage to the OCS and/or OFCS). If the SMF 44 has received the third party charging indication, the SMF 44 may perform one or more of the following actions: the SMF 44 may send CDR or charging message to the visited OCS and/or OFCS, the visited OCS and/or OFCS may send the CDR or charging message to the home OCS and/or OFCS, the visited and/or home OCS and/or OFCS may perform the charging for the third party and not charging for the user and/or the SMF 44 may send CDR or charging message to the home OCS and/or OFCS, or the home OCS and/or OFCS may perform the charging for the third party and not charging for the user.

At step 407, the SMF 44 may send to a UPF 43 a message (e.g. network slice establishment request) to establish the user plane including one or more of the following information: the network slicing information, the network slice ID, the policy, or the S-NSSAI. The message may include the service data flow information, the user identity, the APN identity, and/or PDU session ID, if applicable. At step 408, the AMF 42 may send to a RAN 41 a message (e.g. network slice establishment request) including one or more of the following information: the network slicing information, the network slice ID, the policy, or the S-NSSAI. The message may also include the service data flow information, the user identity, the APN identity, and/or PDU session ID, if applicable. At step 409, the RAN 41 may send to a wireless device 40 a message (e.g. network slice establishment request) including one or more of the following information: the network slicing information, the network slice ID, the policy, or the S-NSSAI. The message may also include the service data flow information, the APN identity, and/or PDU session ID, if applicable. At step 410, the wireless device 40 may acknowledge the RAN 41 by sending a response message (e.g. network slice establishment response). At step 411, the RAN 41 may acknowledge the AMF 42 by sending a response message (e.g. network slice establishment response). At step 412, the AMF 42 may acknowledge the SMF 44 by sending a response message (e.g. network slice establishment response). At step 413, the UPF 43 may acknowledge the SMF 44 by sending a response message (e.g. network slice establishment response). The SMF 44 may receive the response from the UPF 43 before receiving the response from the AMF 42. At step 414, the SMF 44 may acknowledge the VPCF 45 by sending a response message (e.g. network slice establishment response). At step 415, the VPCF 45 may acknowledge the VNEF 47 by sending a response message (e.g. network slice response). At step 416, the VNEF 47 may acknowledge the VAF 48 by sending a response message (e.g. network slice response). The application service may be performed on the slice between the application and the wireless device (e.g. after the slice may be established successfully).

An AF may be located in a home PLMN. A visited policy control function, VPCF, may receive, from a first network entity, a first message configured to request a network slice for a wireless device, the first message including at least one of: a network slice request indication; a required bandwidth of the network slice; an allowed latency of the network slice; a priority information of the network slice; a service provider identifier of a service provider requesting the network slice; a slice type information associated with the network slice; a charging information for the network slice; an S-NSSAI; service data flow information; user identity; an APN identity; a policy; and/or the like. The VPCF may perform at least one of the following actions: creating/generating a network slice identifier for the network slice based on the first message; and/or transmitting, to a second network entity, a second message configured to request to establish the network slice for the wireless device, the second message including the network slice identifier.

The first network entity may be a home policy control function, HPCF. The second network entity may be a session management function, SMF. The SMF may further transmit, to an access and mobility management function, AMF, a network slice establishment request associated with the network slice for the wireless device with the network slice identifier. The AMF may request a network slice establishment to the wireless device, directly or through a base station, by transmitting at least the network slice identifier, and/or may receive a response for the request of the network slice establishment. The SMF may receive a response message for the network slice establishment request.

The SMF may further perform a charging function (e.g. collecting the data and/or time usage of the user and/or reporting the usage to the OCS and/or OFCS) if the charging policy is received from the PCF. The SMF may have received a third party charging indication from the PCF. The SMF may include this indication and/or a third party identifier in the CDR or charging message. The SMF may further send CDR or charging message to the visited OCS and/or OFCS. The visited OCS and/or OFCS may perform charging for the third party and/or not charging for the user. The visited OCS and/or OFCS may further send the CDR or charging message to the home OCS and/or OFCS. The home OCS and/or OFCS may perform charging for the third party and/or not charging for the user. The SMF may send CDR and/or charging message to the home OCS and/or OFCS. The home OCS and/or OFCS may perform charging for the third party and/or not charging for the user.

An AF may be located in a visited PLMN. A visited policy control function, VPCF, may receive, from a first network entity, a first message configured to request a network slice for a wireless device, the first message including at least one of: a network slice request indication; a required bandwidth of the network slice; an allowed latency of the network slice; a priority information of the network slice; a service provider identifier of a service provider requesting the network slice; a slice type information associated with the network slice; a charging information for the network slice; an S-NSSAI; service data flow information; a user identity; an APN identity; and/or the like. The PCF may perform at least one of the following actions: creating/generating a network slice identifier for the network slice based on the first message; transmitting, to a second network entity, a second message including network slice identifier and/or one or more elements of the first message; receiving the response message from the second network entity including the policy; transmitting, to a third network entity, a third message configured to request to establish the network slice for the wireless device, the third message including the network slice identifier.

The first network entity may be a visited application function VAF, and/or visited network exposure function, VNEF. The second network entity may be a home policy control function HPCF. The third network entity may be a session management function, SMF. The SMF may transmit, to an access and mobility management function, AMF, a network slice establishment request associated with the network slice for the wireless device with the network slice identifier. The AMF may request a network slice establishment to the wireless device, directly or through a base station, by transmitting at least the network slice identifier, and/or may receive a response for the request of the network slice establishment. The AMF may receive a response message for the network slice establishment request.

The SMF may further perform a charging function (e.g. collecting the data and/or time usage of the user and/or reporting the usage to the OCS and/or OFCS) if the charging policy is received from the PCF. If the SMF has received a third party charging indication from the PCF, the SMF may include this indication and/or third party identifier in the CDR and/or charging message. The SMF may further send CDR and/or charging message to the visited OCS and/or OFCS. The visited OCS and/or OFCS may perform charging for the third party and/or not charging for the user. The visited OCS and/or OFCS may further send the CDR or charging message to the home OCS and/or OFCS. The home OCS and/or OFCS may perform charging for the third party and/or not charging for the user. The SMF may send CDR and/or charging message to the home OCS and/or OFCS. The home OCS and/or OFCS may perform charging for the third party and/or not charging for the user.

Figure 17:
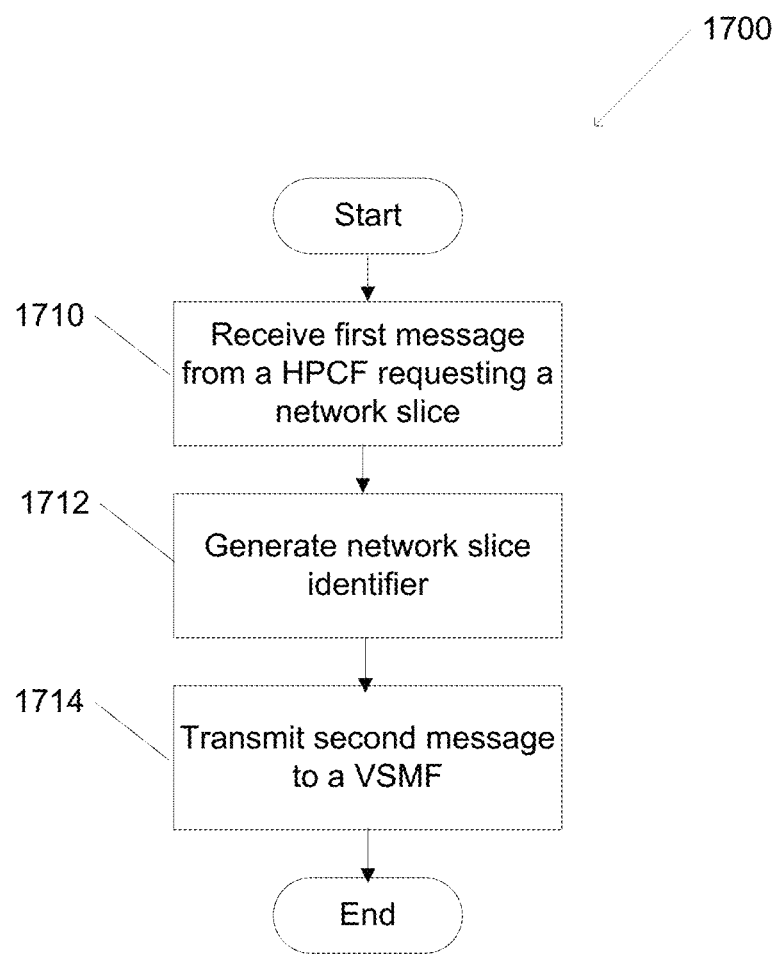
FIG. 17 shows an example of establishing a network slice via a home policy control function (HPCF).

FIG. 17 shows an example of establishing a network slice via a HPCF. Example 1700 includes receiving (1710) a first message requesting a network slice. The first message may be received from a HPCF. The first message may request a network slice for a wireless device and may include a third party charging indication of a third party identified by a third party identifier and/or a charging policy. A network slice identifier may be generated (1712) for the network slice. A second message may be transmitted (1714) to request the establishment of the network slice. The second message may be sent to a VSMF and may include the network slice identifier, the third party charging indication, and/or the charging policy.

Figure 18:
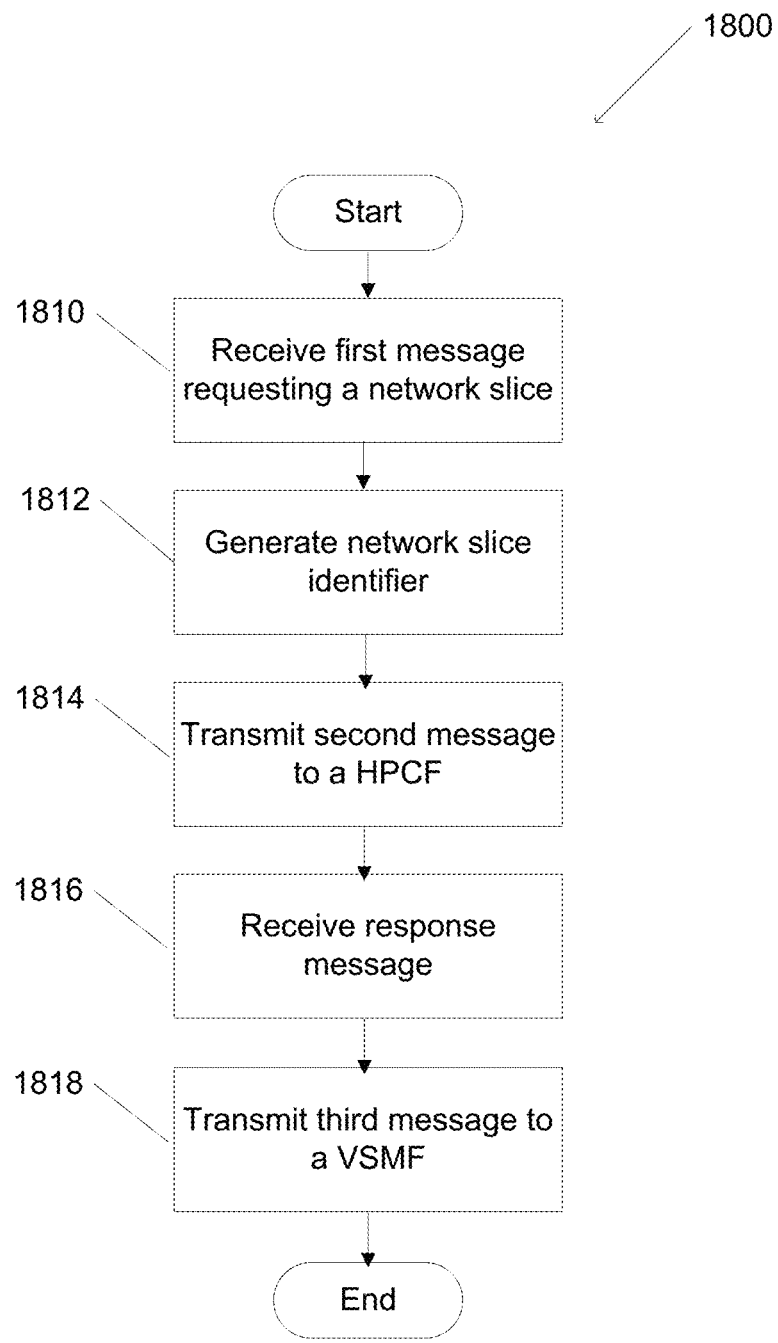
FIG. 18 shows an example of establishing a network slice via a visited application function (VAF).

FIG. 18 shows an example of establishing a network slice via a VAF. The example 1800 includes receiving (1810) a first message requesting a network slice. The first message may be received from a VAF and may request a network slice for a wireless device. The first message may include a required bandwidth of the network slice, a third party identifier, and/or a third party charging indication. A network slice identifier may be generated (1812) and a second message may be transmitted (1814). The second message may be transmitted to a HPCF and/or include the network slice identifier. A response message may be received (1816). The response message may be received from the HPCF and/or may include a charging policy. A third message may be sent (1818). The third message may be sent to a VSMF and/or request the establishment of the network slice. The third message may include the network slice identifier, the third party identifier and third party charging indication, and/or the charging policy.

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may include: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to provide the result of a functional module.

Systems, apparatuses, and methods may perform operations of multi-carrier communications described herein. Additionally or alternatively, a non-transitory tangible computer readable media may include instructions executable by one or more processors configured to cause operations of multi-carrier communications described herein. An article of manufacture may include a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may include communication networks including devices such as base stations, wireless devices or user equipment (UE), servers, switches, antennas, and/or the like. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
    receiving, by a visited policy control function and from a first home network entity, a first message indicating a request for a network slice for a wireless device, wherein the first message comprises:
        a third party charging indication; and
        a charging policy;
    generating, based on the first message, a network slice identifier for the network slice; and
    sending, by the visited policy control function and to a visited session management function, a second message indicating a request to establish the network slice for the wireless device, wherein the second message comprises:
        the network slice identifier;
        the third party charging indication; and
        the charging policy.

2. The method of claim 1, wherein the first home network entity comprises a home policy control function.

3. The method of claim 1, wherein the first message comprises at least one of:
    a third party identifier;
    an identifier of a service provider associated with the request for the network slice;
    network slice selection assistance information;
    service data flow information;
    a user identity;
    an identity of an access point name;

an indication of a required bandwidth of the network slice;
an indication of an allowed latency of the network slice;
an indication of priority information associated with the network slice; or
an indication of a slice type associated with the network slice.

4. The method of claim 1, further comprising:
sending, by the visited session management function, to the wireless device, and via a visited access and mobility management function, a network slice establishment request associated with the network slice for the wireless device, wherein the network slice establishment request comprises the network slice identifier.

5. The method of claim 1, further comprising sending, by the visited session management function and to at least one of a home online charging system or a home offline charging system, at least one charging data record or at least one charging message.

6. The method of claim 1, further comprising performing, by the visited session management function, a charging function comprising:
collecting data or time usage of the wireless device;
sending, to at least one of a visited online charging system or a visited offline charging system, at least one charging data record or at least one charging message comprising at least one of:
a third party identifier; or
the third party charging indication.

7. The method of claim 6, further comprising performing at least one charging action, wherein the at least one charging action comprises at least one of:
charging, by the visited online charging system, for the third party based on the at least one charging data record or the at least one charging message;
charging, by the visited offline charging system, for the third party based on the at least one charging data record or the at least one charging message;
sending, by the visited online charging system to a home online charging system, the at least one charging data record or the at least one charging message; or
sending, by the visited offline charging system to a home offline charging system, the at least one charging data record or the at least one charging message.

8. The method of claim 1, wherein the charging policy comprises a policy for third party charging.

9. A visited policy control function comprising:
one or more processors; and
memory storing instructions that, when executed by the one or more processors, cause the visited policy control function to:
receive, from a first home network entity, a first message indicating a request for a network slice for a wireless device, wherein the first message comprises:
a third party charging indication; and
a charging policy;
generate, based on the first message, a network slice identifier for the network slice; and
send, to a visited session management function, a second message indicating a request to establish the network slice for the wireless device, wherein the second message comprises:
the network slice identifier;
the third party charging indication; and
the charging policy.

10. The visited policy control function of claim 9, wherein the first home network entity comprises a home policy control function.

11. The visited policy control function of claim 9, wherein the first message comprises at least one of:
a third party identifier;
an identifier of a service provider associated with the request for the network slice;
network slice selection assistance information;
service data flow information;
a user identity;
an identity of an access point name;
an indication of a required bandwidth of the network slice;
an indication of an allowed latency of the network slice;
an indication of priority information associated with the network slice; or
an indication of a slice type associated with the network slice.

12. The visited policy control function of claim 9, wherein the charging policy comprises a policy for third party charging.

13. A system comprising:
a first home network entity;
a visited policy control function; and
a visited session management function,
wherein the first home network entity is configured to:
send, to the visited policy control function, a first message indicating a request for a network slice for a wireless device, wherein the first message comprises:
a third party charging indication; and
a charging policy, and
wherein the visited policy control function is configured to:
generate, based on the first message, a network slice identifier for the network slice; and
send, to the visited session management function, a second message indicating a request to establish the network slice for the wireless device, wherein the second message comprises:
the network slice identifier;
the third party charging indication; and
the charging policy.

14. The system of claim 13, wherein the first home network entity comprises a home policy control function.

15. The system of claim 13, wherein the first message comprises at least one of:
a third party identifier;
an identifier of a service provider associated with the request for the network slice;
network slice selection assistance information;
service data flow information;
a user identity;
an identity of an access point name;
an indication of a required bandwidth of the network slice;
an indication of an allowed latency of the network slice;
an indication of priority information associated with the network slice; or
an indication of a slice type associated with the network slice.

16. The system of claim 13, wherein the visited session management function is configured to:
  send, to the wireless device via a visited access and mobility management function, a network slice establishment request associated with the network slice for the wireless device, wherein the network slice establishment request comprises the network slice identifier.

17. The system of claim 13, wherein the visited session management function is further configured to send, to at least one of a home online charging system or a home offline charging system, at least one charging data record or at least one charging message.

18. The system of claim 13, further comprising:
  a visited online charging system; and
  a visited offline charging system,
  wherein the visited session management function is configured to perform a charging function comprising:
    collecting data or time usage of the wireless device; and
    sending, to at least one of the visited online charging system or the visited offline charging system, at least one charging data record or at least one charging message comprising at least one of:
      a third party identifier; or
      the third party charging indication.

19. The system of claim 18, wherein the visited online charging system is configured to perform at least one charging action, wherein the at least one charging action comprises at least one of:
  charging for the third party based on the at least one charging data record or the at least one charging message; or
  sending, to a home online charging system, the at least one charging data record or the at least one charging message.

20. The system of claim 18, wherein the visited offline charging system is configured to perform at least one charging action, wherein the at least one charging action comprises at least one of:
  charging for the third party based on the at least one charging data record or the at least one charging message; or
  sending, to a home offline charging system, the at least one charging data record or the at least one charging message.

21. The system of claim 13, wherein the charging policy comprises a policy for third party charging.

* * * * *

UNITED STATES PATENT AND TRADEMARK OFFICE
CERTIFICATE OF CORRECTION

PATENT NO. : 11,153,813 B2
APPLICATION NO. : 16/102336
DATED : October 19, 2021
INVENTOR(S) : Qiao et al.

It is certified that error appears in the above-identified patent and that said Letters Patent is hereby corrected as shown below:

On the Title Page

Page 3, Column 1, item (56) Other Publications, Line 5:
Delete "Huawi," and insert --Huawei,-- therefor In the Specification Column 4, Detailed Description, Line 50:
Delete "SLAB" and insert --SLAs-- therefor Column 16, Detailed Description, Line 65:
Delete "(5-NSSAI)." and insert --(S-NSSAI).-- therefor Signed and Sealed this
Twenty-third Day of May, 2023

Katherine Kelly Vidal
*Director of the United States Patent and Trademark Office*